United States Patent
Uchino et al.

(10) Patent No.: US 10,516,507 B2
(45) Date of Patent: Dec. 24, 2019

(54) RADIO COMMUNICATION DEVICE

(71) Applicant: NTT DOCOMO, INC., Tokyo (JP)

(72) Inventors: Tooru Uchino, Tokyo (JP); Wuri Andarmawanti Hapsari, Tokyo (JP); Hideaki Takahashi, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 40 days.

(21) Appl. No.: 15/775,504

(22) PCT Filed: Nov. 8, 2016

(86) PCT No.: PCT/JP2016/083085
§ 371 (c)(1),
(2) Date: May 11, 2018

(87) PCT Pub. No.: WO2017/082244
PCT Pub. Date: May 18, 2017

(65) Prior Publication Data
US 2018/0351705 A1    Dec. 6, 2018

(30) Foreign Application Priority Data

Nov. 13, 2015  (JP) ................. 2015-223485

(51) Int. Cl.
H04L 1/18 (2006.01)
H04L 1/08 (2006.01)
(Continued)

(52) U.S. Cl.
CPC .............. H04L 1/1816 (2013.01); H04L 1/08 (2013.01); H04L 1/189 (2013.01); H04L 1/1893 (2013.01);
(Continued)

(58) Field of Classification Search
CPC .................................................. H04L 1/1816
See application file for complete search history.

(56) References Cited

U.S. PATENT DOCUMENTS

2009/0238105 A1* 9/2009 Wu ................... H04W 52/0216
                                                              370/311
2010/0329188 A1   12/2010 Jen
(Continued)

FOREIGN PATENT DOCUMENTS

CN         101567770 A      10/2009

OTHER PUBLICATIONS

Extended European Search Report issued in the counterpart European Patent Application No. 16864205.6, dated Jun. 14, 2019 (9 pages).
(Continued)

Primary Examiner — John D Blanton
(74) Attorney, Agent, or Firm — Osha Liang LLP

(57) ABSTRACT

A radio communication device that avoids the trouble arising because of transmission and reception of a signal repeatedly several times, and performs communication appropriately with a radio base station is provided. The radio communication device (100) is the one in which repeated transmission and reception is performed depending on a reception power level of a radio signal transmitted by a radio base station (200) and includes a receiving unit (110) that receives a physical downlink control channel transmitted repeatedly several times; a bundling unit (131) that bundles the physical downlink control channel transmitted several times; and a discontinuous reception controlling unit (140) that detects whether it is necessary to start a timer for managing an active state in a discontinuous reception control based on the bundled physical downlink control channel, and upon detecting that it is not necessary to start the timer, shifts to an inactive state without starting the timer but stopping the already started timer.

9 Claims, 17 Drawing Sheets

(51) Int. Cl.
*H04W 52/02* (2009.01)
*H04W 72/04* (2009.01)

(52) U.S. Cl.
CPC ... *H04W 52/0216* (2013.01); *H04W 52/0245* (2013.01); *H04W 72/042* (2013.01); *Y02D 70/1262* (2018.01); *Y02D 70/1264* (2018.01); *Y02D 70/21* (2018.01); *Y02D 70/24* (2018.01)

(56) References Cited

U.S. PATENT DOCUMENTS

| | | | |
|---|---|---|---|
| 2013/0242833 A1* | 9/2013 | Ahn | H04W 72/082 370/311 |
| 2015/0029923 A1 | 1/2015 | Xu et al. | |
| 2015/0131579 A1* | 5/2015 | Li | H04L 1/08 370/329 |

OTHER PUBLICATIONS

International Search Report issued in PCT/JP2016/083085 dated Jan. 24, 2017 (1 page).
Written Opinion of the International Searching Authority issued in PCT/JP2016/083085 dated Jan. 24, 2017 (4 pages).
LG Electronics Inc.; "DRX related timers handling"; 3GPP TSG-RAN WG2 Meeting #92, R2-156766; Anaheim, USA; Nov. 16-20, 2015 (3 pages).
Ericsson; "Remaining user plane issues for Rel-13 LC and CE UEs"; 3GPP TSG-RAN WG2 #92, Tdoc R2-156776; Anaheim, USA; Nov. 16-20, 2015 (4 pages).
Ericsson; "Revised WI: Further LTE Physical Layer Enhancements for MTC"; 3GPP TSG RAN Meeting #67, RP-150492; Shanghai, China; Mar. 9-12, 2015 (8 pages).
ETSI TS 136 321 V12.4.0; "LTE; Evolved Universal Terrestrial Radio Access (E-UTRA); Medium Access Control (MAC) protocol specification (3GPP TS 36.321 version 12.4.0 Release 12)"; Feb. 2015; (62 pages).

* cited by examiner

FIG. 2
(a)
USUAL DL ASSIGNMENT METHOD
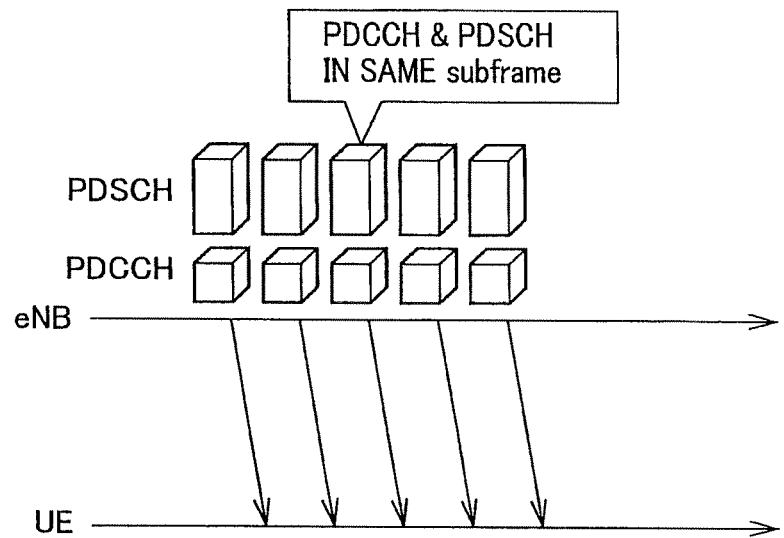
(b)
MTC UE ASSIGNMENT METHOD
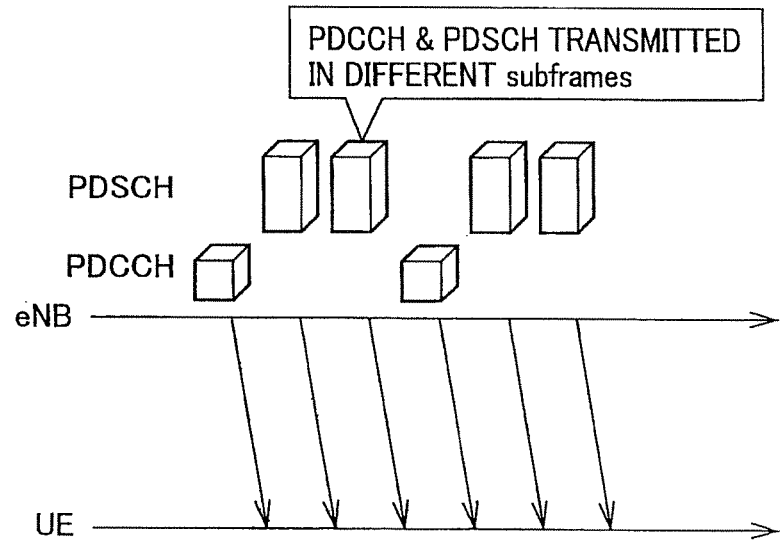

FIG. 8
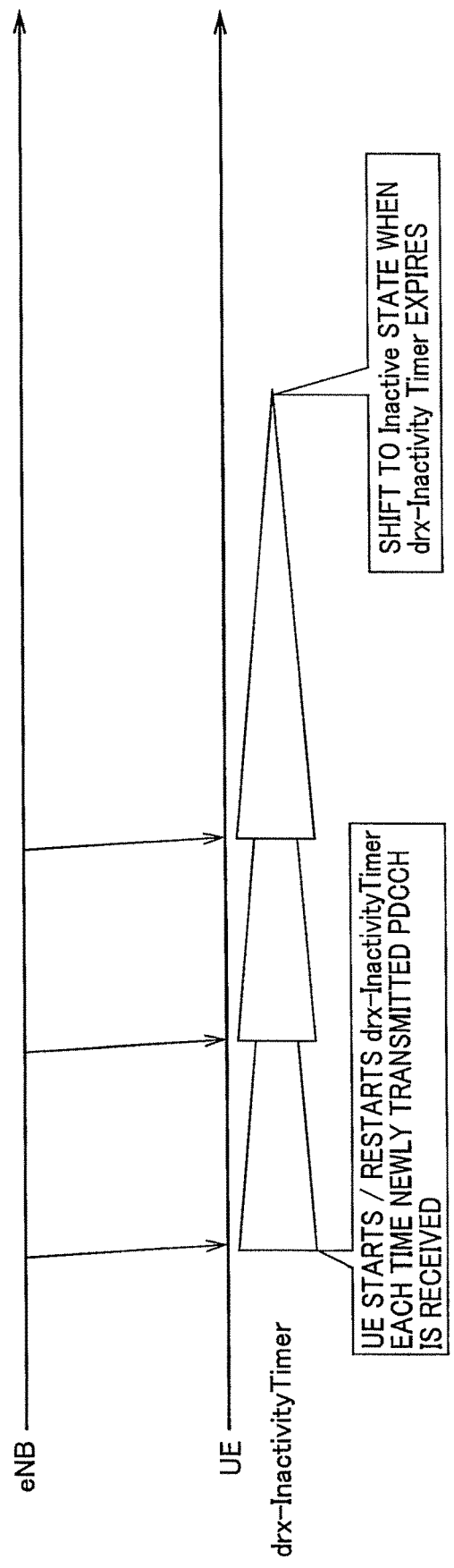
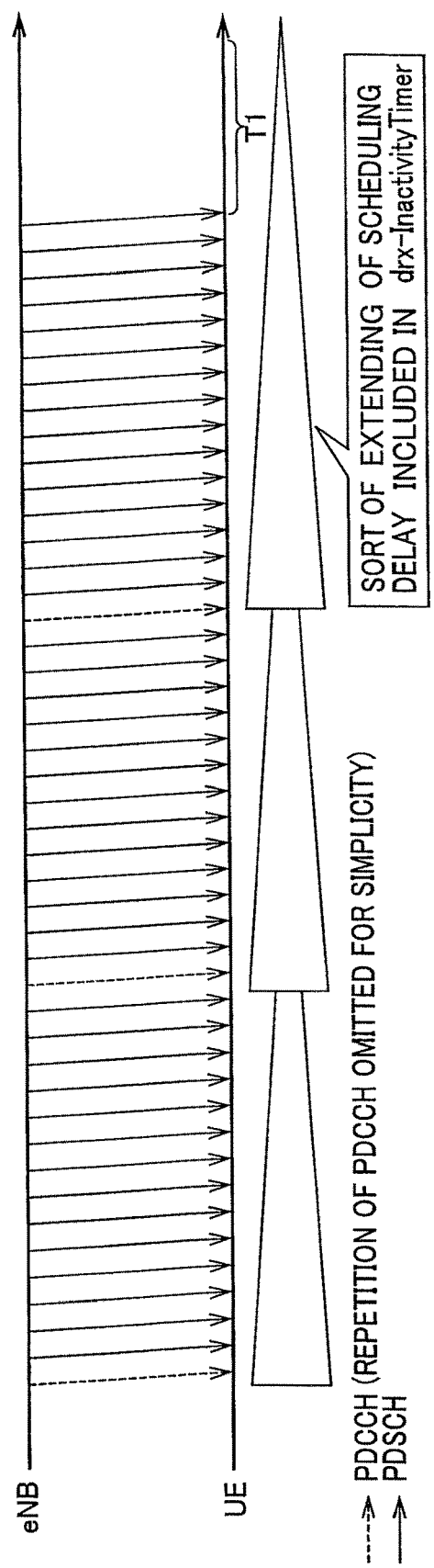

FIG. 9
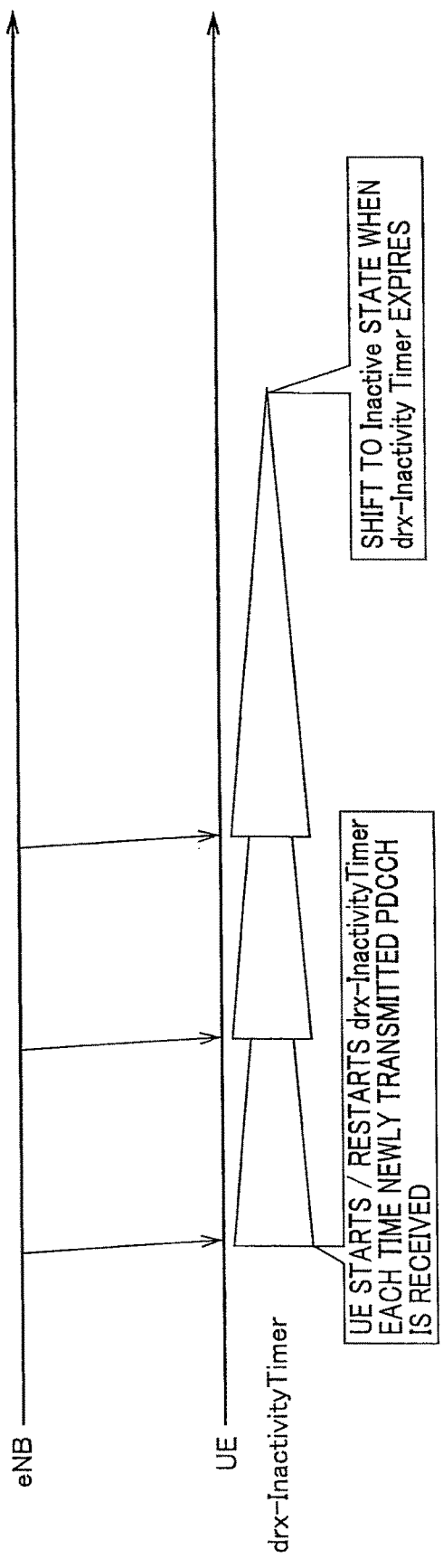
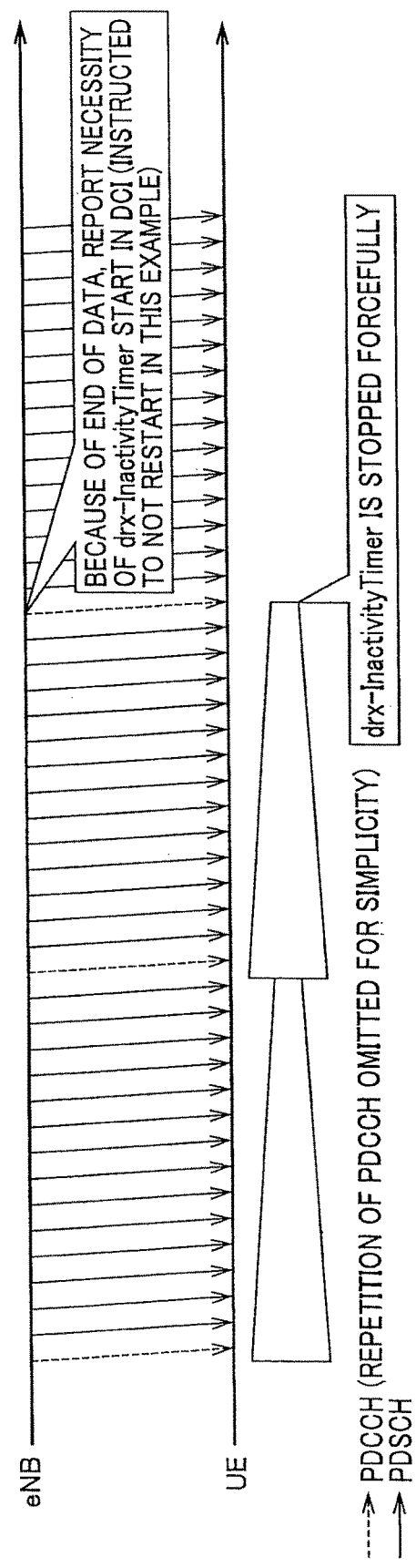

FIG. 10
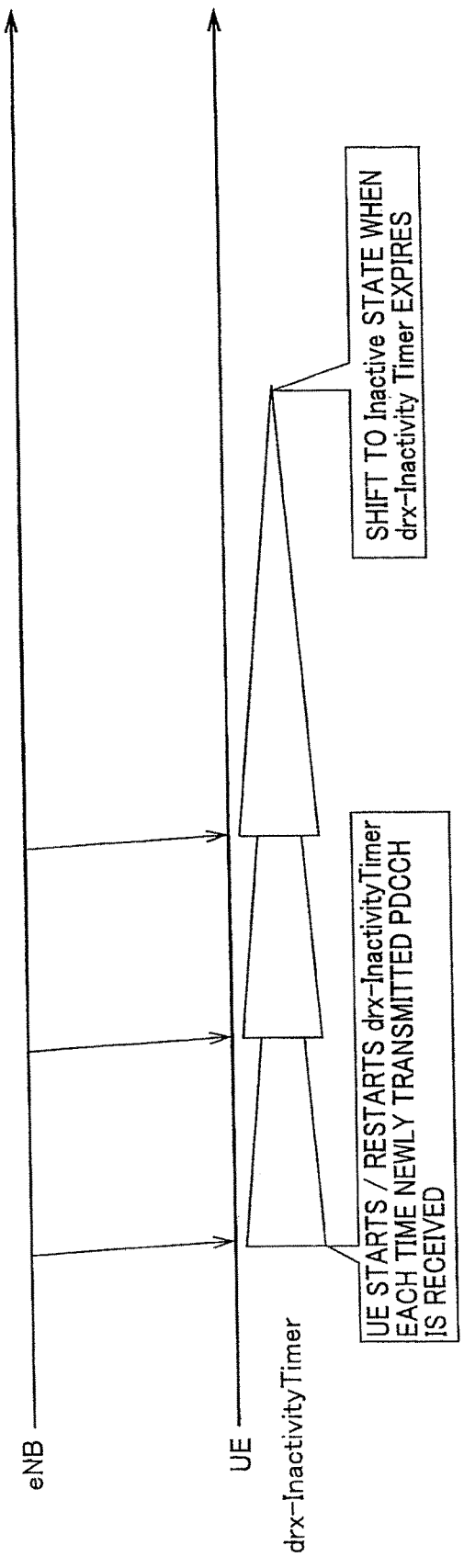
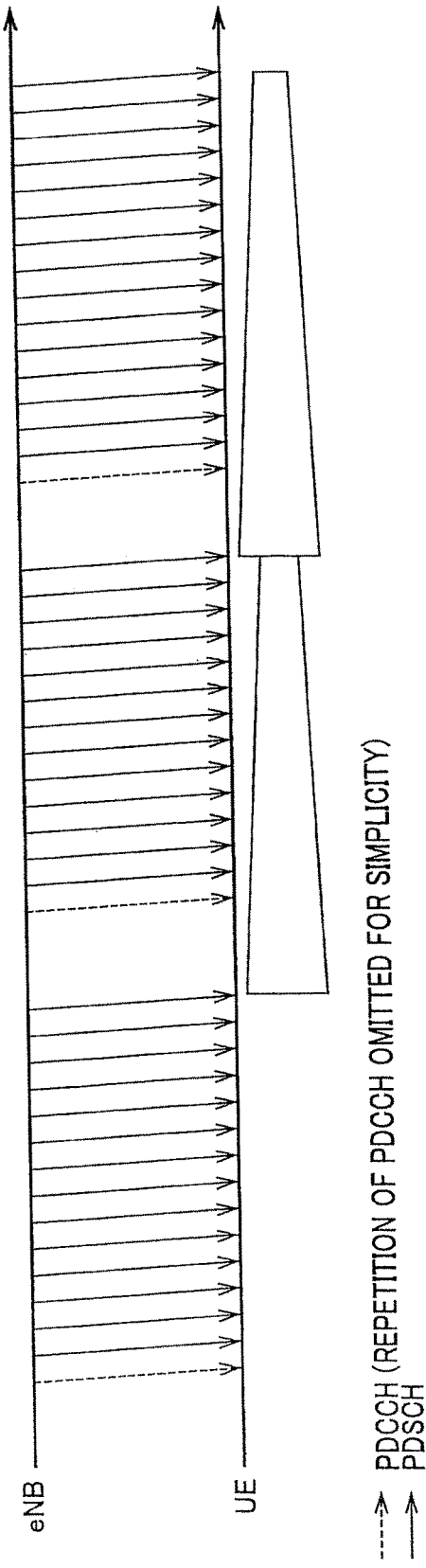

RADIO COMMUNICATION DEVICE

TECHNICAL FIELD

The present invention relates to a radio communication device in which transmission and reception of a radio signal transmitted by a radio base station is performed repeatedly depending on a reception power level of the radio signal.

BACKGROUND ART

In Release 13 of 3GPP (3rd Generation Partnership Project), aiming at MTC (Machine Type Communication) that considers IoT (Internet of Things) scenario, a user device of LC (Low Complexity) and EC mode (Enhanced Coverage mode) is being researched (see Non-Patent Document 1).

Moreover, in LTE (Long Term Evolution) system, DRX (Discontinuous Reception) control is adopted to achieve battery saving of a user device (radio communication terminal) (see Non-Patent Document 2).

PRIOR ART DOCUMENT

Non-Patent Document

[Non-Patent Document 1]: 3GPP RP-150492, "Further LTE Physical Layer Enhancements for MTC", 3GPP, March, 2015

[Non-Patent Document 2]: 3GPP TS 36.321 version 12.4.0 Release 12 LTE; Evolved Universal Terrestrial Radio Access (E-UTRA); Medium Access Control (MAC) protocol specification, 3GPP, December, 2014

SUMMARY OF THE INVENTION

To realize narrow-band communication, a user device for MTC has a limitation on the number of bits that can be received at a time. Therefore, in the user device for MTC, transmission of PDCCH (physical downlink control channel) and PDSCH (physical downlink shared channel) in separate subframes is being considered to perform resource assignment.

Moreover, the EC mode takes into consideration a situation in which a user device is installed in an underground room and the like where radio waves do not reach easily, and the EC mode is intended to expand the coverage of a cell. Therefore, a user device to which the EC mode is applied performs transmission and reception of a signal repeatedly several times to satisfy a required quality; however, there are following issues.

When performing the DRX control, to perform the transmission and reception of a signal repeatedly several times, it is necessary to set a timer of the user device to a longer time to manage an active state thereof resulting in higher battery consumption. When performing the DRX control, a mismatch may occur between the user device and a radio base station with respect to DRX state of the user device (active state/inactive state). Mismatch of a resource may occur between the user device and the radio base station if the user device receives the PDCCH by mistake. If the user device cannot receive the PDCCH correctly, the radio base station will transmit the PDSCH in vain.

The present invention has been made in view of the above discussion. One object of the present invention is to provide a radio communication device capable of appropriately performing communication with a radio base station by eliminating the issues arising from transmission and reception of a signal repeatedly several times.

According to one aspect of the present invention, a radio communication device in which repeated transmission and reception is performed depending on a reception power level of a radio signal transmitted by a radio base station, includes a receiving unit that receives a physical downlink control channel transmitted repeatedly several times; a bundling unit that bundles the physical downlink control channel transmitted several times; and a discontinuous reception controlling unit that detects whether it is necessary to start a timer for managing an active state in a discontinuous reception control based on the bundled physical downlink control channel, and upon detecting that it is not necessary to start the timer, shifts to an inactive state without starting the timer but stopping the already started timer.

According to another aspect of the present invention, a radio communication device in which repeated transmission and reception is performed depending on a reception power level of a radio signal transmitted by a radio base station, includes a receiving unit that receives a physical downlink control channel transmitted repeatedly several times and a physical downlink shared channel transmitted repeatedly several times; a bundling unit that bundles the physical downlink control channel transmitted several times and the physical downlink shared channel transmitted several times; and a discontinuous reception controlling unit that starts a timer for managing an active state in a discontinuous reception control after reception of the physical downlink shared channel based on the bundled physical downlink control channel. The discontinuous reception controlling unit shifts to an inactive state when the timer expires.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; a bundling unit that bundles the physical downlink control channel transmitted several times; and a discontinuous reception controlling unit that starts a timer for managing an active state in a discontinuous reception control at a timing of successful decoding of the physical downlink control channel. The discontinuous reception controlling unit starts the timer for a period that takes into account a period from the point in time at which the reception of the physical downlink control channel is attempted first to a point in time at which the timer is started. The discontinuous reception controlling unit shifts to an inactive state when the timer expires.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; a bundling unit that bundles the physical downlink control channel transmitted several times; and a discontinuous reception controlling unit that starts a timer for managing an active state in a discontinuous reception control at the timing at which the last one of the physical downlink control channel is received among the physical downlink control channel transmitted several times. The discontinuous reception controlling unit shifts to an inactive state when the timer expires.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; a bundling unit that bundles the physical downlink control channel transmitted several times; and a discontinuous reception controlling unit that starts a timer for managing an active state in a discontinuous reception control each time the physical downlink control channel is received. The discontinuous reception controlling unit shifts to an inactive state when the timer expires.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; and a decoding unit that attempts decoding of the physical downlink control channel, and upon succeeding in the decoding, does not perform decoding of following physical downlink control channel transmitted repeatedly, or upon succeeding in the decoding of the following physical downlink control channel transmitted repeatedly, discards the physical downlink control channel. The receiving unit attempts reception of a physical downlink shared channel transmitted repeatedly several times based on the physical downlink control channel that was successfully decoded first.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; a decoding unit that attempts decoding of the physical downlink control channel, and after succeeding in the decoding once, upon succeeding in the decoding of a different physical downlink control channel by using following physical downlink control channel transmitted repeatedly, discards the physical downlink control channel that was decoded earlier. The receiving unit attempts reception of a physical downlink shared channel transmitted repeatedly several times based on the physical downlink control channel that was successfully decoded subsequently.

According to still another aspect of the present invention, a radio communication device in which repeated transmission and reception is performed depending on a reception power level of a radio signal transmitted by a radio base station, includes a receiving unit that receives a physical downlink control channel transmitted repeatedly several times; a decoding unit that attempts decoding of the physical downlink control channel, and even after succeeding in the decoding of an earlier physical downlink control channel, attempts decoding of a different physical downlink control channel by using following physical downlink control channel transmitted repeatedly. The receiving unit attempts, when succeeding in the decoding of a plurality of different physical downlink control channels, reception of a physical downlink shared channel transmitted repeatedly several times based on each of the physical downlink control channels that was successfully decoded.

BRIEF DESCRIPTION OF DRAWINGS

FIG. 2 depicts a resource assignment method.

FIG. 8 depicts the DRX control performed by DRX timer.

FIG. 9 depicts a control of the DRX timer in a first method according to a first embodiment.

FIG. 10 depicts a control of the DRX timer in a second method according to the first embodiment.

MODES FOR CARRYING OUT THE INVENTION

Figure 1:
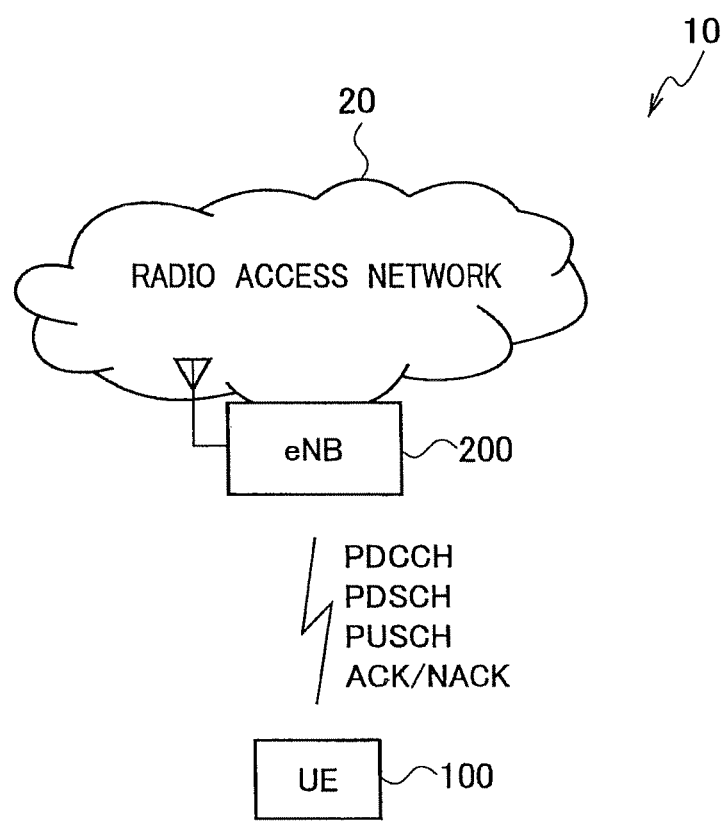
FIG. 1 is an overall structural diagram of a mobile communication system 10.

Exemplary embodiments are explained below with reference to the accompanying drawings. In the drawings, structural elements having the same function or configuration are indicated by the same or similar reference numerals and the explanation thereof is appropriately omitted.

First Embodiment (1) Overall Structural Configuration of Mobile Communication System FIG. 1 is an overall structural diagram of a mobile communication system 10 according to the present embodiment. As shown in FIG. 1, the mobile communication system 10 is a radio communication system in accordance with LTE (Long Term Evolution) or LTE-Advanced. The mobile communication system 10 includes a radio access network 20 and a user device 100 (hereinafter, "UE 100").

The radio access network 20 is E-UTRAN (Evolved Universal Terrestrial Radio Access Network) stipulated in 3GPP, and includes a radio base station 200 (hereinafter, "eNB 200").

The UE 100 and the eNB 200 perform radio communication in accordance with the specification of the LTE. In the present embodiment, the UE 100 and the eNB 200 perform transmission and reception of a signal or data such as, for example, PDCCH (physical downlink control channel), PDSCH (physical downlink shared channel), PUSCH (physical uplink shared channel), PUCCH (physical uplink control channel) such as ACK/NACK, and SRS (sounding reference symbol). The PDCCH includes control information such as resource assignment information and scheduling information.

The mobile communication system 10 is not necessarily limited to the LTE (E-UTRAN). For example, the radio access network 20 can be a radio access network including a radio base station that performs radio communication with the UE 100 stipulated as 5G.

The type of the UE 100 connected to the radio access network 20 is not particularly limited; however, it is assumed in the present embodiment that the UE 100 is MTC-UE capable of performing MTC (Machine Type Communication). The MTC is defined as a communication that is carried out in the 3GPP without human intervention. In a low-cost MTC-UE, a resource is assigned by a method that is different from the normal resource assignment method to realize narrow-band communication.

As shown in FIG. 2(a), in the case of scheduling of usual downlink, the PDCCH and the PDSCH are transmitted in the same subframe. However, in the narrow-band communication, the number of bits that can be transmitted per TTI (subframe) is limited. Therefore, as shown in FIG. 2(b), in the MTC-UE, the PDCCH and the PDSCH are transmitted in separate TTIs (inter-subframe scheduling).

Moreover, the LC (Low Complexity) and the EC mode (Enhanced Coverage mode) have been introduced as a standard for the MTC-UE.

The main standard content of the LC mode is as below:
Use bandwidth: 1.4 MHz
Transmission power: 3 dB reduced (conventionally 23 dBm)
RF reception number (RF Rx chains): 1
Communication method: Half duplex communication (optional)
Downlink (DL) maximum transmission speed: 1 Mbps Moreover, the EC mode is intended to expand the coverage of a cell by the lower reception power level (RSRP/RSRQ) of the radio signal transmitted by the eNB 200. The EC mode takes into consideration a situation in which the MTC-UE is installed in an underground room and the like where radio waves do not reach easily.

Four reception power levels mentioned below are prescribed in the EC mode:
Zero coverage extension
5 dB coverage extension
10 dB coverage extension
15 dB coverage extension The Zero coverage extension does not expand the coverage of the cell, that is, the EC mode is not applied. The 5 dB coverage extension reduces the reception power level by 5 dB. Similarly, the 10 dB coverage extension and the 15 dB coverage extension reduce the reception power level by 10 dB and 15 dB respectively.

Moreover, in the EC mode, the number of times of repetition (a repetition number) corresponding to the level of each of the coverage extension can be prescribed. For example, a repetition number that is greater than 100 can be mapped with the 15 dB coverage extension.

That is, in the EC mode, it is assumed that a required quality can be satisfied by transmitting the same signal repeatedly several times between the UE 100 and the eNB 200.

Figure 3:
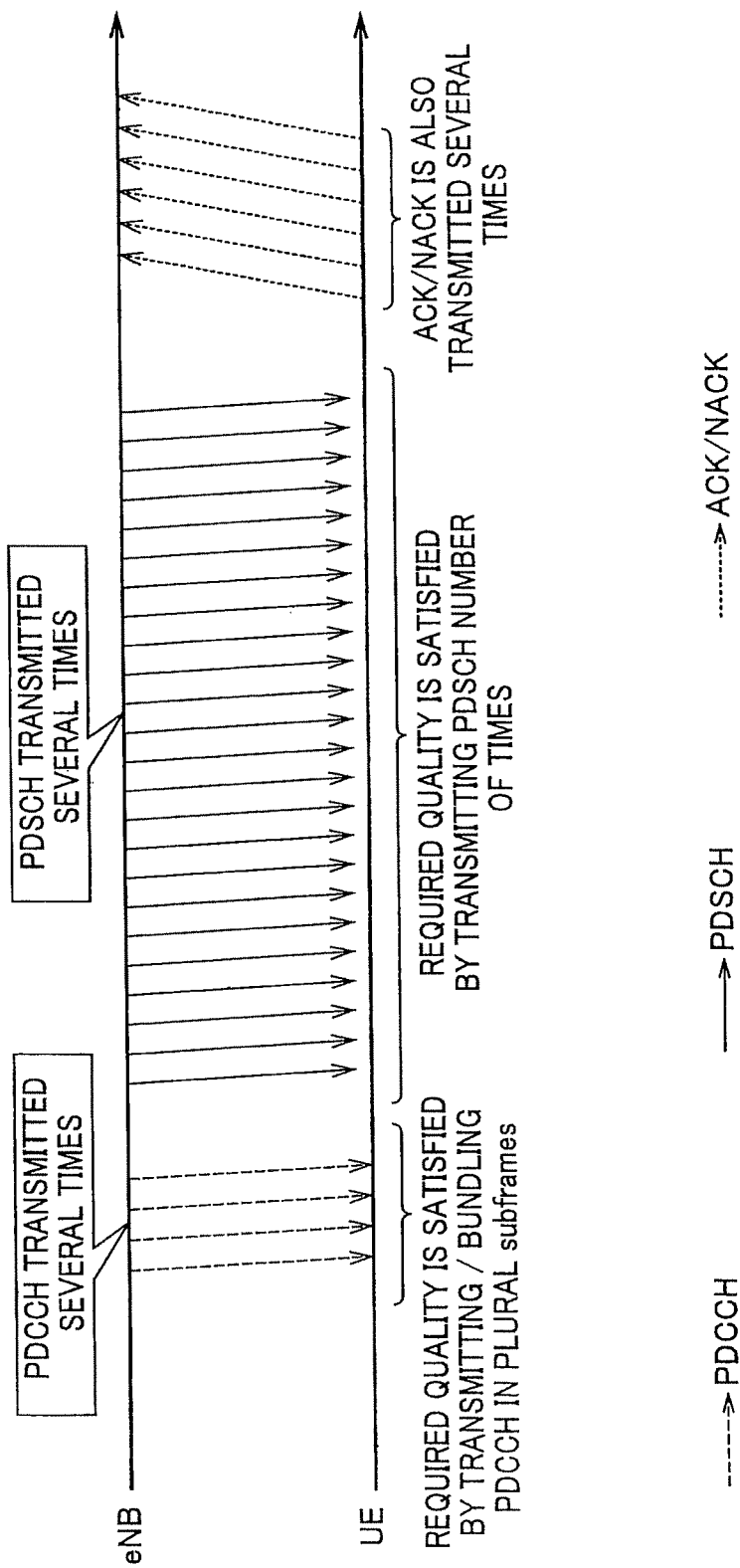
FIG. 3 depicts an example of repeated transmission of a signal in EC mode.

FIG. 3 depicts an example of the repeated transmission of a signal (repetition) in the EC mode. In the example shown in FIG. 3, in addition to transmitting a data channel such as the PDSCH repeatedly several times, the eNB 200 transmits even a signal such as the PDCCH repeatedly several times to the UE 100.

The UE 100 receives the PDCCH transmitted repeatedly several times spanning for a plurality of subframes, bundles them, and decodes to acquire the PDCCH. With this configuration, the required quality can be satisfied. The same is true for the PDSCH.

Moreover, the UE 100 transmits ACK or NACK (hereinafter, "ACK/NACK") corresponding to the PDSCH to the eNB 200 repeatedly several times. The eNB 200 receives the ACK/NACK transmitted repeatedly several times spanning for a plurality of subframes, bundles them, and decodes to acquire the ACK/NACK.

Although not shown in FIG. 3, the UE 100 transmits also the PUSCH to the eNB 200 repeatedly several times, and the eNB 200 receives the PUSCH transmitted repeatedly several times spanning for a plurality of subframes, bundles them, and decodes to acquire the PUSCH.

Figure 4:
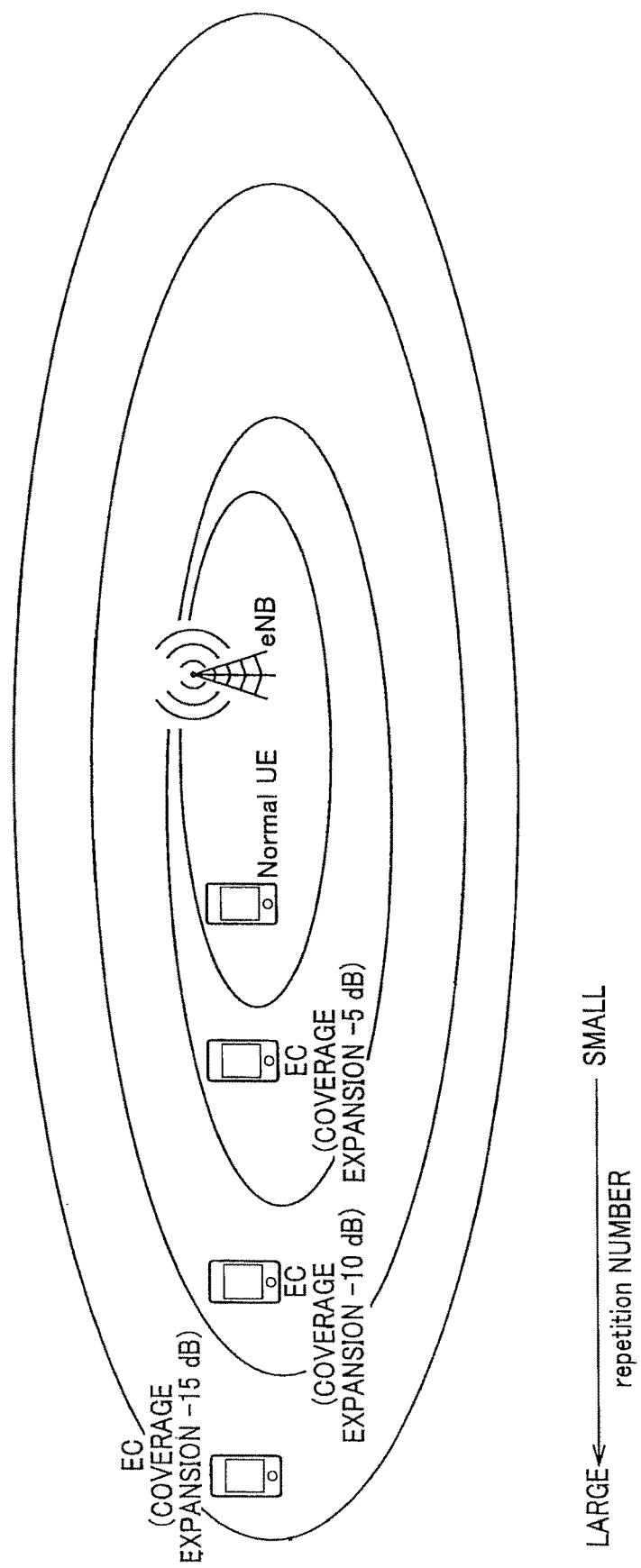
FIG. 4 depicts a concept of a repetition number that depends on EC level.

In the EC mode, it is considered to prescribe a profile of the UE 100 per required quality. For example, the number of times of repetition increases upon requiring a great deal of electric power for the coverage. That is, as shown in FIG. 4, the number of times of repetition (the repetition number) increases in the order of −5 dB, −10 dB, and −15 dB.

The UE 100 according to the present embodiment can be a device to which the EC mode in which a radio signal is transmitted by the eNB 200 repeatedly depending on the reception power level of the radio signal is applicable.

Moreover, in the present embodiment, DRX (Discontinuous Reception) control (discontinuous reception control) is used to achieve battery saving in the UE 100. In the DRX control, RRC connected UE 100 is managed in two states of an active (Active) state and an inactive (Inactive) state.

In the active state, the UE 100 monitors the PDCCH and reports feedback information (CQI/PMI/RI/PTI, and the like) to the eNB 200.

In the inactive state, to achieve reduced battery consumption, the UE 100 neither monitors the PDCCH nor reports the feedback information to the eNB 200.

When one of the following is satisfied, the UE 100 is in the active state. When none of the following is satisfied, the UE 100 is in the inactive state.

Figure 5:
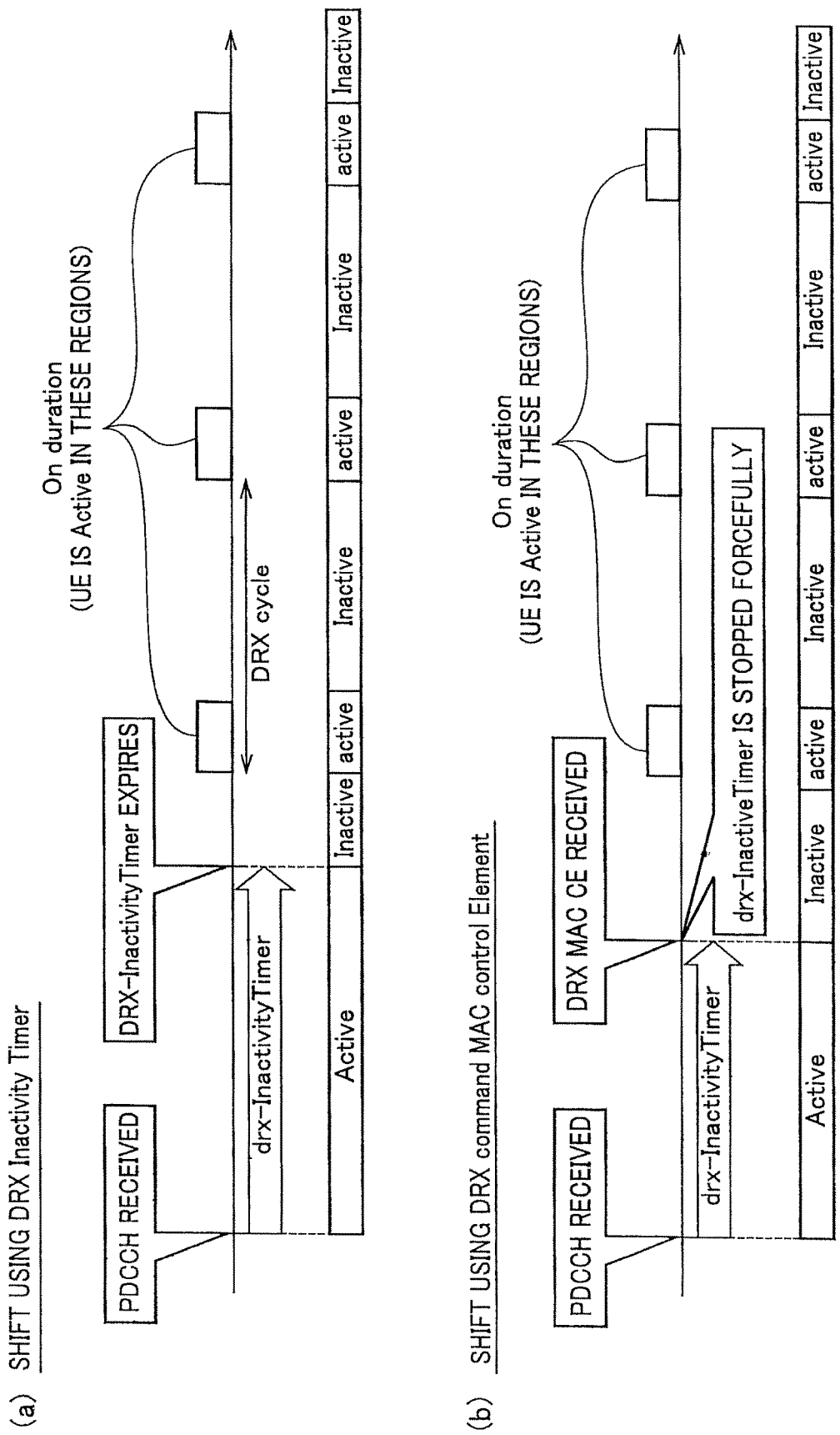
FIG. 5 depicts an outline of DRX control.

When any one of On duration Timer, drx-InactivityTimer, drx-RetransmissionTimer, mac-contensionResolutionTimer is in started state When a scheduling request (Scheduling request) is transmitted When UL grant has been assigned for re-transmission of UL HARQ When a random access response (Random Access Response) has been received, and the PDCCH instructing new transmission is not received subsequently FIG. 5 depicts an outline of the DRX control. FIG. 5(a) depicts DRX control of the UE 100 by the drx-InactivityTimer (hereinafter, "DRX timer"). Upon receiving the PDCCH, the UE 100 starts/restarts the DRX timer. When the DRX timer is running, the UE 100 is in the active state. The UE 100 shifts (transits) to the inactive state when the DRX timer expires. In the DRX control, reception of the PDCCH is enabled only during the active state of DRX cycle.

FIG. 5(b) depicts the DRX control of the UE 100 by a stop command of the DRX timer transmitted by the eNB 200. Upon receiving the PDCCH, the UE 100 starts/restarts the DRX timer. Upon receiving the stop command (for example, DRX command MAC control Element) to stop the DRX timer transmitted by the eNB 200, even if the DRX timer has not expired yet, the UE 100 forcefully stops the DRX timer and shifts to the inactive state.

(2) Functional Block Configuration of Mobile Communication System

A functional block configuration of the mobile communication system 10 is explained below. Specifically, functional block configurations of the UE 100 and the eNB 200 are explained below.

(2.1) UE 100

Figure 6:
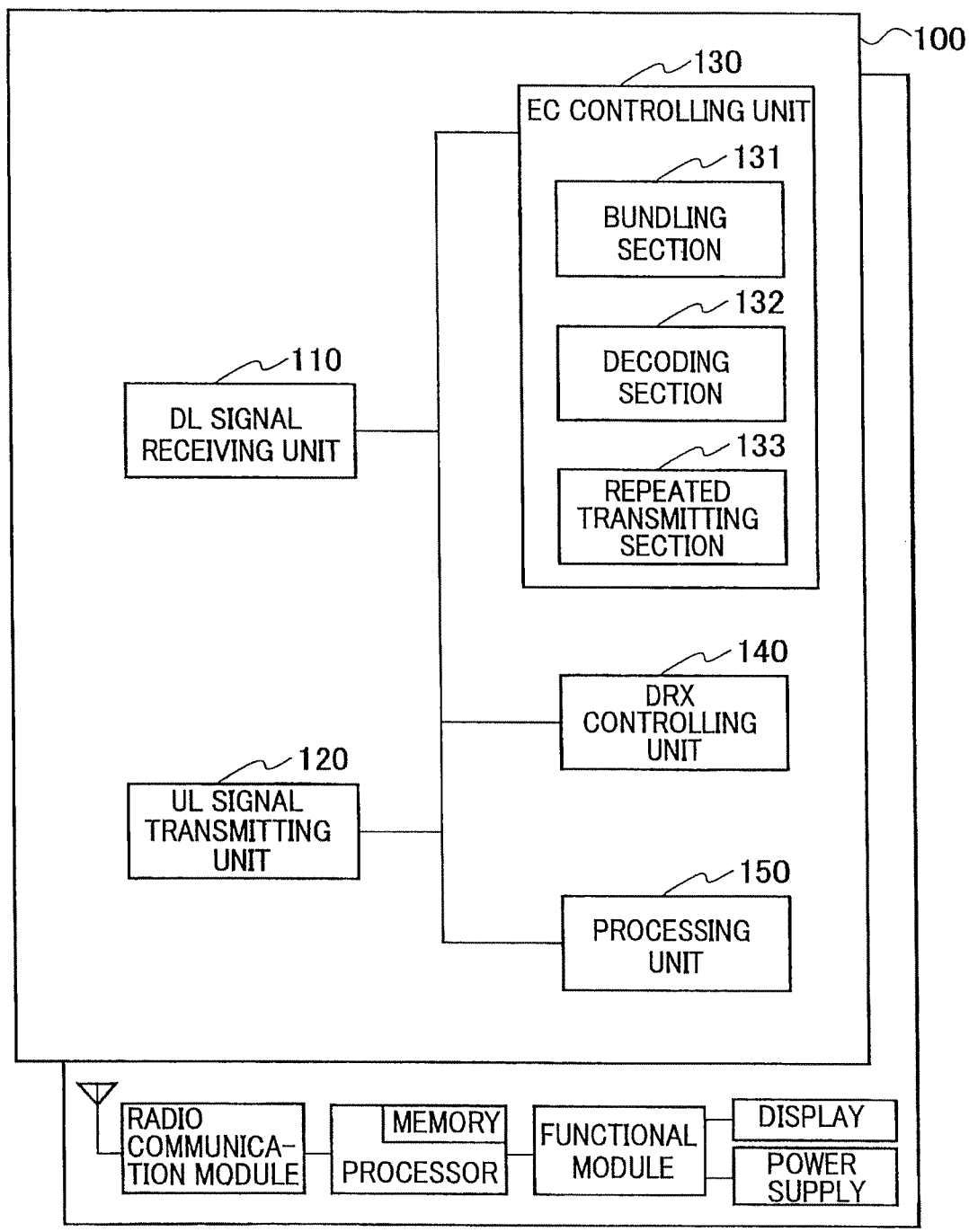
FIG. 6 is a functional block diagram of UE 100.

FIG. 6 is a functional block diagram of the UE 100. As shown in FIG. 6, the UE 100 includes DL signal receiving unit 110, UL signal transmitting unit 120, EC controlling unit 130, DRX controlling unit 140, and a processing unit 150.

As shown in FIG. 6, each functional block of the UE 100 is implemented by hardware elements such as a radio communication module, a processor (including a memory), a functional module (user IF, position detection, camera, audio video, and the like), a display, and a power supply (including a battery).

A low-cost MTC terminal for MTC can be used as the UE 100 according to the present embodiment. Only the minimum functions can be provided as the functional module in such MTC terminal, moreover, the display can be omitted.

Moreover, the UE 100 according to the present embodiment can be a terminal to which the EC mode is applied. That is, the UE 100 can be a terminal in which the number of times of transmission repetition (the repetition number) can be prescribed depending on the reception power level of the radio signal transmitted by the eNB 200. The number of times of transmission repetition can be prescribed based on the type of the signal.

The DL signal receiving unit 110 receives a downlink signal (DL signal) transmitted by the eNB 200. In the present embodiment, the DL signal receiving unit 110 receives the PDCCH and the PDSCH transmitted repeatedly several times by the eNB 200.

The UL signal transmitting unit 120 transmits an uplink signal (UL signal) to the eNB 200. In the present embodiment, the UL signal transmitting unit 120 transmits the PUSCH repeatedly several times to the eNB 200. The processing unit 150 performs a predetermined processing.

The EC controlling unit 130 controls the repeated transmission and reception of the signal. The signal transmitted and received repeatedly are practically the same signals (includes similar signals having practically the same content with only header information such as a sequence number different). The EC controlling unit 130 includes a bundling section (unit) 131, a decoding section (unit) 132, and a repeated transmitting section (unit) 133.

The bundling section 131 bundles the PDCCH and the PDSCH transmitted several times by the eNB 200.

The decoding section 132 attempts decoding of the PDCCH and the PDSCH bundled by the bundling section 131. The repeated transmitting section 133 controls the UL signal transmitting unit 120 to transmit the PUSCH repeatedly several times.

The DRX controlling unit 140 performs the DRX control. In the present embodiment, the DRX controlling unit 140 detects whether it is necessary to start the DRX timer for managing the active state in the DRX control based on the bundled and decoded physical downlink control channel, and upon detecting that it is not necessary to start, shifts to the inactive state without starting the DRX timer but stopping the DRX timer that has been already started.

Moreover, the DRX controlling unit 140 starts the DRX timer for managing the active state in the DRX control after receiving the PDSCH based on the bundled and decoded PDCCH. After receiving the PDSCH, for example, a timing of last reception of the PDCCH transmitted repeatedly, a timing of first reception of the PDCCH transmitted repeatedly, a timing of successful decoding of the PDCCH, a timing of transmission of the ACK/NACK corresponding to the PDCCH, and the like.

(2.2) eNB 200

Figure 7:
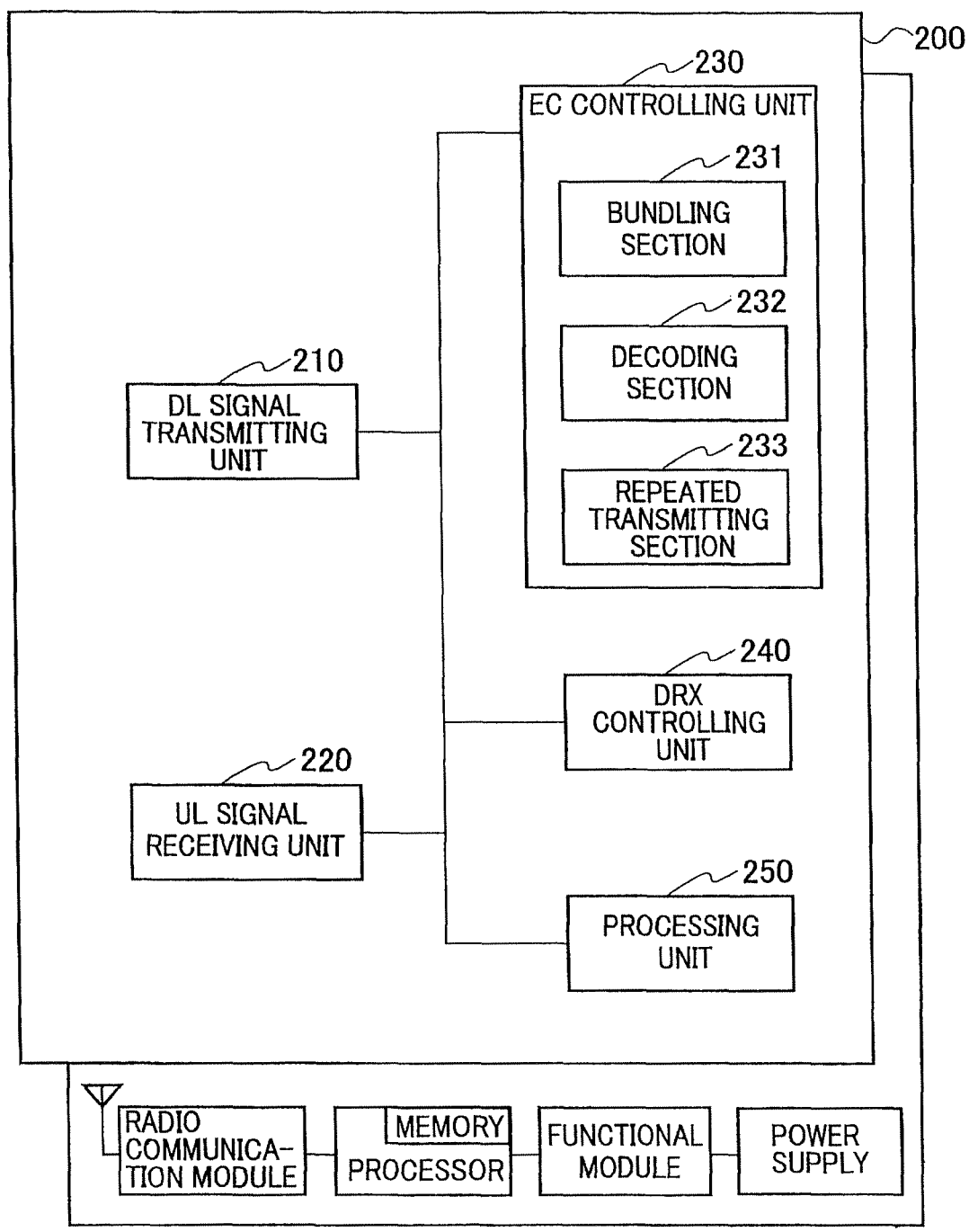
FIG. 7 is a functional block diagram of eNB 200.

FIG. 7 is a functional block diagram of the eNB 200. As shown in FIG. 7, the eNB 200 includes DL signal transmitting unit 210, UL signal receiving unit 220, EC controlling unit 230, DRX controlling unit 240, and a processing unit 250.

As shown in FIG. 7, each functional block of the eNB 200 is realized by a hardware element such as a radio communication module, a processor (including a memory), a functional module (a network IF and the like), and a power supply.

The DL signal transmitting unit 210 transmits the downlink signal (DL signal) to the UE 100. In the present embodiment, the DL signal transmitting unit 210 transmits the PDCCH and the PDSCH repeatedly several times to the UE 100.

The UL signal receiving unit 220 receives the uplink signal (UL signal) transmitted by the UE 100. In the present embodiment, the UL signal receiving unit 220 receives the PUSCH and the ACK/NACK transmitted repeatedly several times by the UE 100. The processing unit 250 performs a predetermined processing.

The EC controlling unit 230 controls the repeated transmission and reception of the signal like the EC controlling unit 230 of the UE 100. The EC controlling unit 230 includes a bundling section (unit) 231, a decoding section (unit) 232, and a repeated transmitting section (unit) 233.

The bundling section 231 bundles the PUSCH and the ACK/NACK transmitted several times by the UE 100. The decoding section 232 attempts decoding of the PUSCH and the ACK/NACK bundled by the bundling section 231. The repeated transmitting section 233 controls the UL signal receiving unit 220 to transmit the PUSCH and the ACK/NACK repeatedly several times to the UE 100.

The DRX controlling unit 240 manages the DRX state of the UE 100 (the active state or the inactive state).

(3) Operation of Mobile Communication System

An operation of the mobile communication system 10 is explained below. In the EC mode, as mentioned above, the signal is transmitted repeatedly (repetition or bundling) and a plurality of the signals are bundled to satisfy the required quality.

A usual DRX timer is a timer that controls in what duration the UE 100 shall expect the following PDCCH after receiving the last PDCCH (containing new assignment information). That is, a packet arrival interval and a scheduling delay of the eNB 200 are considered. For example, when the DRX timer has been set to 200 ms, the UE 100 shall expect the following PDCCH within 200 ms from the reception of the last PDCCH.

On the other hand, in the UE 100 of the EC mode, because a mismatch occurs between the reception timings of the PDCCH and the PDSCH, the set value (timer time) of the DRX timer must be set longer.

For example, when the repeated transmission of the downlink is to be carried out over a span of 100 ms, in reality, it is necessary to maintain the active state of the UE 100 for (200+100) ms. That is, it is necessary to set the DRX timer to 300 ms. In other words, it is an image that extends the scheduling delay included in the DRX timer.

However, if the DRX timer is too long, the UE 100 remains in the active state for a longer time after transmission and reception of data such as the PDSCH, leading to battery consumption.

FIG. 8(*a*) depicts the DRX control performed by the usual DRX timer that is not in the EC mode. Each time the UE 100 receives a newly transmitted PDCCH, the DRX timer is started (restarted). In the following explanation, "start" includes restart. The UE 100 shifts to the inactive state when the DRX timer expires.

FIG. 8(*b*) depicts the DRX control performed by the DRX timer when repeated transmission is performed in the EC mode. In FIG. 8(*b*), the representation of the repeated transmission of the PDCCH has been omitted. As mentioned above, when the repeated transmission performed, it is necessary to set the DRX timer longer than usual. Therefore, after completion of the transmission and reception of data (transmission and reception of the PDSCH) and until expiry of the DRX timer, the UE 100 remains in the active state for a longer time T1, leading to the battery consumption.

Therefore, in the present embodiment, the battery consumption is reduced by using a first method or a second method explained below.

First Method

In the first method, after transmission and reception of data, the UE 100 autonomously determines whether to shift to the inactive state by referring to the PDCCH or the PDSCH.

As explained with reference to FIG. 8(*b*), when the repeated transmission performed, the DRX timer is set longer than usual. With this prerequisite, to compensate for the scheduling delay because of the repeated transmission, the eNB 200 notifies the UE 100 to terminate the DRX timer at a timing at which it decides that there is no following data. Accordingly, it is avoided that the UE 100 unnecessarily remains in the active state or shifts to the active state. That is, the eNB 200 transmits an explicit instruction to the UE 100 after the transmission and reception of data upon determining that additional scheduling is unnecessary.

FIG. 9(*a*) is similar to FIG. 8(*a*). FIG. 9(*b*) depicts the control performed in the first method. The eNB 200 determines whether to stop the DRX timer of the UE 100. For example, the eNB 200 can determine whether to stop the DRX timer by using the following information. The eNB 200 can make the determination by using one of the following information or can make the determination by using a combination of a plurality of pieces of such information.

Statistical information regarding an arrival interval of packets

PDCP SDU size (for example, when the PDCP SDU size is smaller than a predetermined value, the eNB 200 considers that there is no data to transmit next and informs the UE 100 that it is not necessary to start the DRX timer (or instructs to terminate the DRX timer). On the other hand, when the PDCP SDU size is equal to or larger than the predetermined value, the eNB 200 considers that there is data to transmit next and instructs the UE 100 the necessity to start the DRX timer or does not set whether it is necessary to start the timer.)

Type of data to be transmitted (for example, when transmitting RLC-ACK (RLC-NACK) in the downlink, the eNB 200 considers that there is no data to transmit next and informs the UE 100 that it is not necessary to start the DRX timer (or instructs to terminate the DRX timer). On the other hand, when transmitting data other than the RLC-ACK (RLC-NACK) in the downlink, the eNB 200 considers that there is data to transmit next and instructs the UE 100 the necessity to start the DRX timer or does not set whether it is necessary to start the timer.)

The eNB 200 sets the determination result in DCI (Downlink Control Information) of the PDCCH and transmits the same to the UE 100.

The UE 100 detects whether it is necessary to start the DRX timer at the reception timing of the PDCCH by referring to the DCI contained in the received PDCCH. When detecting an instruction "not necessary to start", the UE 100 does not start the DRX timer. That is, when the DRX timer is not to be started at the reception timing of the PDCCH but the DRX timer that was already started continues to run, the UE 100 forcefully stops the DRX timer and shifts to the inactive state.

Moreover, it is allowable for the eNB 200 to set the determination result in control information of the PDSCH and transmit the same to the UE 100. It is allowable for the UE 100 to forcefully stop the running DRX timer and shift to the inactive state at a timing at which the last PDSCH is received among the PDSCH transmitted repeatedly or at a timing of successful decoding of the PDSCH.

Second Method

In the second method, upon receiving the PDCCH (that contains the assignment information) addressed to itself, the UE 100 starts the DRX timer after transmission and reception of data based on the received PDCCH (after transmission and reception of the PDSCH). That is, the UE 100 is in the active state for a predetermined period (time until the expiration of the DRX timer) from a point in time at which the transmission and reception of data is completed.

In the second method, scheduling delay because of the repeated transmission is not taken into account in the DRX timer. That is, the DRX timer is not set longer than usual as shown in FIG. 8(*b*) but set to the same time as the usual DRX timer as shown in FIG. 8(*a*).

FIG. 10(*a*) is similar to FIG. 8(*a*). FIG. 10(*b*) depicts the control performed in the second method. The UE 100 starts the DRX timer after the transmission and reception of the PDSCH.

The trigger for starting the DRX timer can be a new PDCCH (new assignment information) as usual, a typical PDCCH including re-transmission (typical assignment information), or anything notified with the PDCCH (DCI) (for example, PDCCH order, Aperiodic CSI/SRS request, and the like).

Moreover, in the case of the downlink, "after the transmission and reception of data" can include, a timing of reception of the PDSCH for a predetermined number of times that is transmitted for a predetermined number of times. Such timing includes a timing at which the last one of the data received for the predetermined number of times is received (see FIG. 10(*b*), or a timing at which the first PDSCH is received among the PDSCH transmitted for the predetermined number of times. Alternatively, this timing can be a timing of the completion of the decoding of the PDSCH (CRC check OK), a timing of transmission of the ACK/NACK corresponding to the PDSCH, or a timing of transmission of the ACK/NACK for a predetermined number of times (or for a predetermined period).

In the case of the uplink, "after the transmission and reception of data" can include a timing of transmission of the last PUSCH that is transmitted for the predetermined number of times, a timing of first transmission of the PUSCH that is transmitted for the predetermined number of times, a timing of first reception of the ACK/NACK with respect to the PUSCH, or a timing of reception of the ACK/NACK for a predetermined number of times (or for a predetermined period).

Moreover, the actual starting timing of the DRX timer can be from the subframe that satisfies the above-explained timings, or can be from the next subframe. In the case of TDD (Time Division Duplex), TDDconfig (DL/UL subframe) can be considered.

Alternatively, it is allowable for the UE 100 to start the DRX timer at the PDSCH reception timing, the PUSCH transmission timing, or each transmission and reception timing of the ACK/NACK corresponding to these.

In the present embodiment, an example is explained by using drx-InactivityTimer that is the usual (existing) DRX timer; however, application of the present invention is not limited to the drx-InactivityTimer. That is, it is allowable to use a new timer (a timer that manages the active state in the DRX control). Such a new timer is started at the time of transmission and reception of the PDSCH or the PUSCH. Even if the drx-InactivityTimer is not started (or has expired), it is considered that the UE 100 is in the active state while the new timer is running.

Moreover, it can be determined whether the control of the present embodiment is to be applied or not based on the EC level of the UE 100 or depending on whether the UE 100 is LC (Low Complexity)-UE. For example, for the EC level (for example, 15 dB coverage extension) that requires more coverage extension, the number of times of repetition to satisfy the required quality increases, and the resource that is wasted when a situation of concern explained with reference to FIG. 8(b) occurs increases, and this is not desirable from the system point of view. Accordingly, in the case of such EC level, it is conceivable to apply the control according to the present embodiment.

On the other hand, for the EC level in which the coverage can be secured to some extent, or when the UE 100 is the LC-UE, because a complexity due to the implementation or application of the control according to the present embodiment is expected, the control according to the present embodiment need not be applied to such the UE 100.

In this regard, the processing unit 150 of the UE 100 maintains information about the EC level of itself or whether it is the LC-UE. The processing unit 150 of the UE 100 can determine whether the control according the present embodiment is to be applied or not based on an application rule notified from a network (for example the eNB 200 and the like).

(4) Effects and Advantages

According to the first embodiment, the following effects and advantages can be obtained. As mentioned earlier, the UE 100 according to the present embodiment detects whether it is necessary to start the DRX timer for managing the active state in the DRX control from the bundled physical downlink control channel, and upon detecting that it is not necessary to start, shifts to the inactive state without starting the DRX timer but stopping the DRX timer that has been already started.

With this configuration, even if the DRX timer is set longer than the usual DRX timer, the UE 100 according to the present embodiment need not maintain the active state in vain, leading to reduction in the battery consumption.

Moreover, the UE 100 according to the present embodiment starts the DRX timer for managing the active state in the DRX control after reception of the PDSCH based on the bundled PDCCH.

As a result, the UE 100 according to the present embodiment can use the DRX timer of the length same as the usual DRX timer without taking into account the scheduling delay because of the transmission and reception of a signal repeatedly several times. Accordingly, it is possible to avoid that the active state is maintained for a longtime in vain, and to reduce the battery consumption.

Accordingly, in the present embodiment, the trouble arising because of transmission and reception of a signal repeatedly several times can be avoided, and communication can be performed appropriately with the radio base station.

Second Embodiment

A second embodiment according to the present invention is explained next. An explanation is mainly given below about the portions that are different from the first embodiment, and an explanation of portions that are similar is accordingly omitted.

In DRX control state, it is desirable that there is always agreement in the DRX states (the active state/the inactive state) between the UE 100 and the eNB 200 to control reception or no reception of the scheduling information of the UE 100.

When a disagreement (mismatch) occurs in the states between the UE 100 and the eNB 200, a trouble arises that the UE 100 unnecessarily shifts to the active state, or it cannot receive the scheduling information (PDCCH) transmitted by the eNB 200.

However, in the EC mode, if the PDCCH itself is transmitted repeatedly by the eNB 200, a disagreement occurs in the DRX states between the UE 100 and the eNB 200 depending on the timing of the decoding of the PDSCH in the UE 100.

Figure 11:
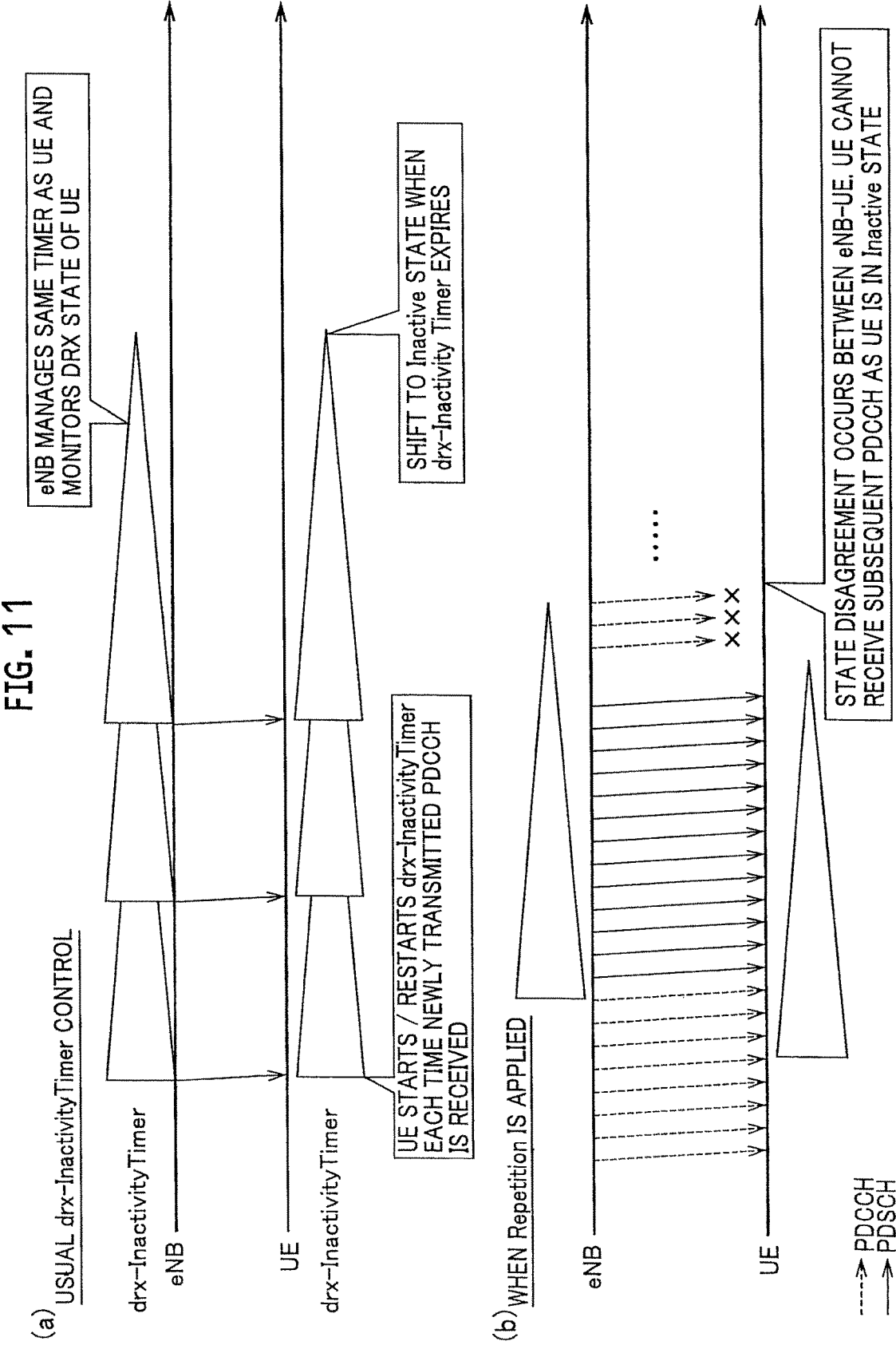
FIG. 11 depicts start timings of the DRX timers of the UE 100 and the eNB 200.

FIG. 11 depicts starting timings of the DRX timers of the UE 100 and the eNB 200. FIG. 11(a) depicts the usual DRX control that is not in the EC mode. The UE 100 starts the DRX timer each time a newly transmitted PDCCH is received. The eNB 200 also uses DRX timer that is the same as the UE 100, starts the DRX timer each time it newly transmits the PDCCH, and monitors the DRX state of the UE 100.

FIG. 11(b) depicts the DRX control performed when the repeated transmission is performed in the EC mode. In the example shown, the eNB 200 repeatedly transmits the PDCCH eight times. Because the eNB 200 cannot grasp when the UE 100 succeeds in the decoding of the PDCCH, the eNB 200 starts the DRX timer at a timing of the last transmission among the repeated transmission (at a timing at which the PDCCH is transmitted last).

When, for example, the UE 100 succeeds in the decoding of the PDCCH on the reception of the fifth transmission among the repeated transmission, it starts the DRX timer at this occasion. Accordingly, the DRX timer of the UE 100 expires before that of the eNB 200. Therefore, it is possible that the eNB 200 transmits the PDCCH before the expiration of the DRX timer; however, the DRX timer in the UE 100 has already expired and the UE 100 has shifted to the inactive state. When this happens, the UE 100 cannot receive the PDCCH.

The present embodiment is intended to avoid such disagreement in the DRX states between the UE 100 and the eNB 200.

(1) Functional Block Configuration of Mobile Communication System

The UE 100 and the eNB 200 according to the present embodiment have the same functional block configuration as the UE 100 and the eNB 200 according to the first embodiment shown in FIGS. 6 and 7.

The DRX controlling unit 140 of the UE 100 according to the present embodiment starts its own DRX timer at a timing of successful decoding of the PDCCH. The DRX controlling unit 140 keeps the DRX timer is started for a period obtained by subtracting from the timer time a time period from a point in time at which the PDCCH is received first among the PDCCH transmitted repeatedly several times to a point in time at which the timer is started (in the case of countdown). Moreover, the DRX controlling unit 140 shifts to the inactive state when the DRX timer expires. When a counting method of the timer is count up, the DRX timer is started for a period obtained by adding to the timer time a time period from a point in time at which the PDCCH is received first among the PDCCH transmitted repeatedly several times to a point in time at which the timer is started.

That is, the DRX controlling unit 140 starts the DRX timer for a timer time that takes into account a period from the point in time at which the reception of the PDCCH is attempted first to a point in time at which the timer is started, and at a timing of successful decoding of the PDCCH.

In this case, the DRX controlling unit 240 of the eNB 200 starts its own DRX timer at a timing at which the first PDCCH is transmitted among the PDCCH transmitted repeatedly several times.

It is allowable for the DRX controlling unit 140 of the UE 100 according to the present embodiment to start its own DRX timer at a timing at which the last PDCCH is received among the PDCCH transmitted repeatedly several times from the eNB 200. The DRX controlling unit 140 shifts to the inactive state when the DRX timer expires. In this case, the DRX controlling unit 240 of the eNB 200 also starts its own DRX timer at a timing at which the last PDCCH is transmitted among the PDCCH transmitted repeatedly several times.

It is allowable for the DRX controlling unit 140 of the UE 100 according to the present embodiment to restart its own DRX timer each time the PDCCH transmitted repeatedly several times is received from the eNB 200. The DRX controlling unit 140 shifts to the inactive state when the DRX timer expires. Similarly, it is allowable for the DRX controlling unit 240 of the eNB 200 to restart its own DRX timer each time the PDCCH is transmitted repeatedly.

(2) Operation of Mobile Communication System

An operation of the mobile communication system 10 is explained below.

As mentioned above, each of the UE 100 and the eNB 200 starts their own DRX timer at one of the three predetermined timings mentioned below.

Figure 12:
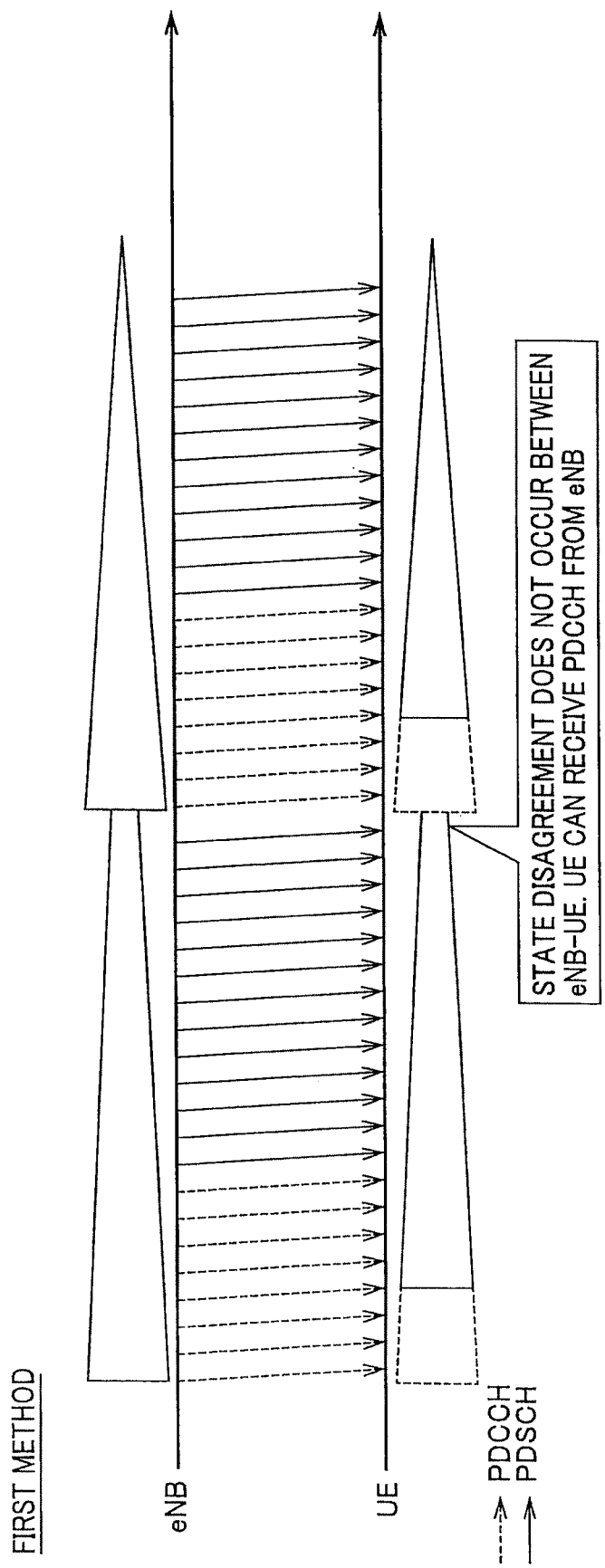
FIG. 12 depicts an operation performed when the DRX timer is started at a first timing according to a second embodiment.

FIG. 12 depicts an operation performed when the DRX timer is started at a first timing. When the decoding of the PDCCH is performed successfully, the UE 100 starts the DRX timer at the timing of successful decoding. However, the UE 100 starts the DRX timer for a period obtained by subtracting from the timer time a time period from a point in time at which the PDCCH is received first among the PDCCH transmitted repeatedly several times to a point in time at which the timer is started.

That is, the UE 100 considers that the DRX timer is started at a timing at which the first subframe of the PDCCH is received among the PDCCH transmitted repeatedly, and starts the DRX timer at the timing at which the decoding is performed successfully. In this case, the eNB 200 starts the DRX timer at a timing at which the first subframe of the PDCCH is transmitted among the PDCCH transmitted repeatedly. With this configuration, the UE 100 and the eNB 200 start their respective DRX timer at substantially the same timing.

Figure 13:
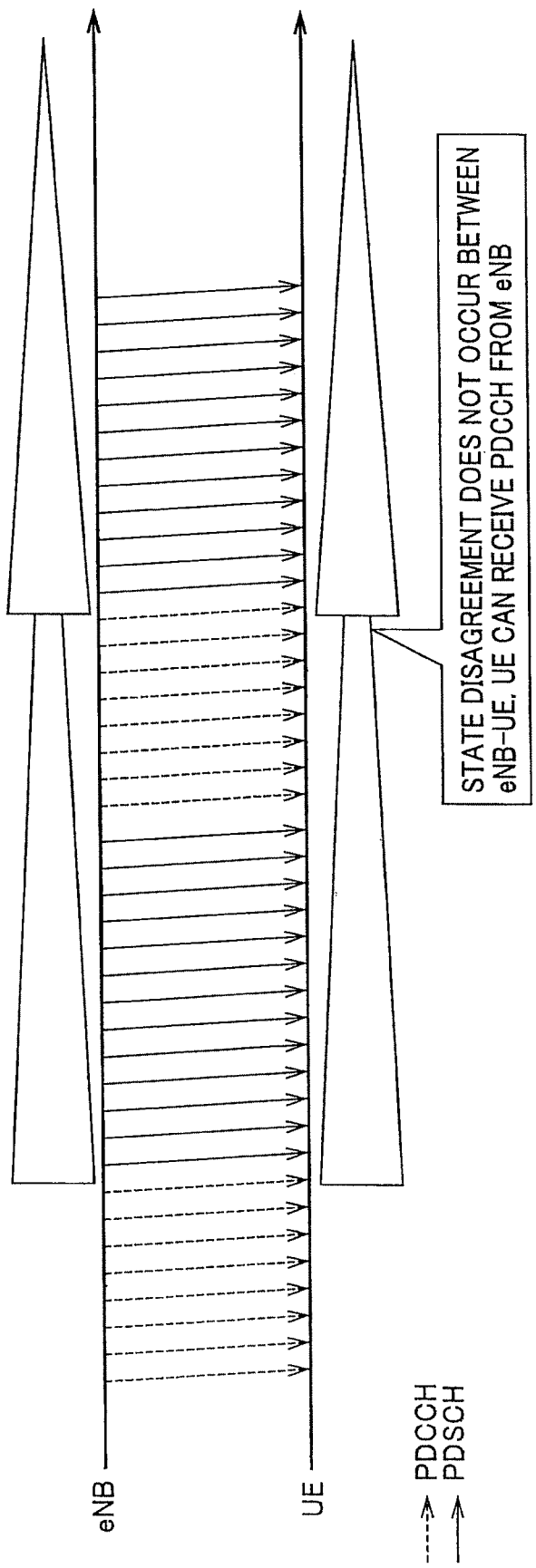
FIG. 13 depicts an operation performed when the DRX timer is started at a second timing according to the second embodiment.

FIG. 13 depicts an operation performed when the DRX timer is started at a second timing. When the decoding of the PDCCH is performed successfully, the UE 100 starts the DRX timer at a timing at which the last subframe of the PDCCH is received among the PDCCH transmitted repeatedly. In this case, the eNB 200 also starts its own DRX timer at a timing at which the last subframe of the PDCCH is transmitted among the PDCCH transmitted repeatedly. With this configuration, the UE 100 and the eNB 200 start their respective DRX timer at substantially the same timing.

As a third timing, if the repeated transmission of the PDCCH continues even after successfully performing the decoding of the PDCCH, the UE 100 starts the DRX timer each time the subframe of the following PDCCH is received. In this case, the eNB 200 restarts the DRX timer each time the PDCCH is transmitted repeatedly. With this configuration, the UE 100 and the eNB 200 start their respective DRX timer at substantially the same timing.

(3) Effects and Advantages

The following effects and advantages can be achieved according to the second embodiment. As mentioned earlier, in the present embodiment, the UE 100 and the eNB 200 start their respective DRX timer at a predetermined timing.

With this configuration, the UE 100 and the eNB 200 start their respective DRX timer at substantially the same timing. Therefore, a disagreement in the DRX states between the UE 100 and the eNB 200 can be avoided (or a period for which the disagreement occurs can be shortened as much as possible).

Accordingly, a situation that the UE 100 cannot receive the PDCCH that was transmitted thereto by the eNB 200 before the expiration of the DRX timer because the DRX timer of the UE 100 has expired before the DRX timer of the eNB 200 can be avoided.

Accordingly, in the present embodiment, the trouble arising because of transmission and reception of a signal repeatedly several times can be avoided, and communication can be performed appropriately with the radio base station.

Third Embodiment

A third embodiment according to the present invention is explained next. An explanation is mainly given below about the portions that are different from the first embodiment, and an explanation of portions that are similar is accordingly omitted.

In the EC mode, when the PDCCH (including the assignment information) is transmitted repeatedly several times, the UE 100 may receive a plurality of different PDCCHs during the period of the repeated transmission.

Figure 14:
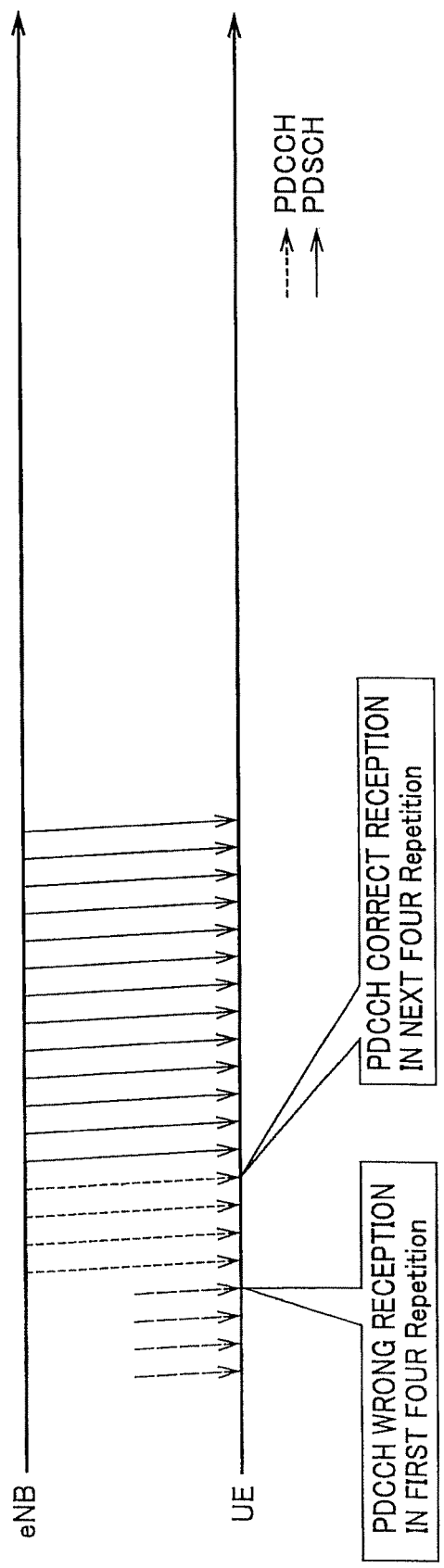
FIG. 14 depicts a situation in which the UE 100 receives a plurality of different PDCCHs by mistake.

FIG. 14 depicts a situation in which the UE 100 receives a plurality of different PDCCHs by mistake. In the example shown, the number of times of repeated transmission (the repetition number) is eight, and the eNB 200 transmits the PDCCH to the UE 100 in eight subframes.

The UE 100 receives four PDCCHs in sequence and succeeds in the decoding of the first PDCCH. However, the PDCCH that was successfully decoded first is actually PDCCH with wrong assignment information because of the influence of noise, interference, and the like.

Furthermore, the UE 100 also receives the PDCCH that are transmitted repeatedly in the fifth to eighth subframes, attempts to decode the PDCCH, and succeeds in decoding of the PDCCH that contains assignment information that is different from that contained in the first PDCCH. The PDCCH that was successfully decoded last is actually the correct PDCCH that is transmitted by the eNB 200.

In this case, a disagreement occurs in assignment resource between the UE 100 and the eNB 200 because the UE 100 cannot grasp which one of the PDCCHs (assignment information) is correct.

The present embodiment is intended to avoid such disagreement in the assignment resource between the UE 100 and the eNB 200.

(1) Functional Block Configuration of Mobile Communication System

The UE 100 and the eNB 200 according to the present embodiment have the same functional block configuration as the UE 100 and the eNB 200 according to the first embodiment shown in FIGS. 6 and 7. In the present embodiment, the UE 100 need not include the DRX controlling unit 140, moreover, the eNB 200 need not include the DRX controlling unit 240.

The decoding section 132 of the UE 100 according to the present embodiment determines according to a predetermined rule which one of the PDCCHs (containing the assignment information) that is successfully decoded is to use.

The following three rules can be considered as the predetermined rule.

Rule 1 (First Decoding Priority):

The decoding section 132 attempts decoding of the PDCCH transmitted repeatedly several times, and when succeeding in the decoding, does not decode the following PDCCH transmitted repeatedly, or, if succeeding in the decoding of the following PDCCH transmitted repeatedly, discards that PDCCH (or does not transmit the same to MAC layer).

Moreover, based on the PDCCH that is successfully decoded first, the DL signal receiving unit 11 attempts reception of the PDSCH transmitted repeatedly several times.

Thus, in Rule 1, when the UE 100 succeeds in the decoding of the PDCCH and it is able to acquire the assignment information contained in the PDCCH, the assignment information acquired first is given priority, and the UE 100 attempts the reception of the PDSCH by using this assignment information.

Rule 2 (Subsequent Decoding Priority):

The decoding section 132 attempts decoding of the PDCCH transmitted repeatedly several times, after succeeding in the decoding once, if succeeding in the decoding of a different PDCCH by using the following PDCCH transmitted repeatedly, discards the PDCCH that was decoded earlier. In this case, based on the PDCCH that was successfully decoded subsequently, the DL signal receiving unit 11 attempts the reception of the PDSCH transmitted repeatedly several times.

In Rule 2, even if the UE 100 succeeds in the decoding of the PDCCH by the repeated transmission and is able to acquire the assignment information included in the PDCCH, if succeeding in the decoding of another PDCCH by following repeated transmission and being able to acquire another assignment information included in this PDCCH, the UE 100 discards the earlier assignment information (or does not transmit the same to the MAC layer).

Rule 3 (Decoding by Using First and Subsequent Occurrence):

The decoding section 132 attempts decoding of the PDCCH transmitted repeatedly several times, even after succeeding in the decoding of an earlier PDCCH, attempts decoding of a different PDCCH by using the following PDCCH transmitted repeatedly. In this case, when succeeding in the decoding of a plurality of different PDCCHs, based on each of PDCCHs that was successfully decoded, the DL signal receiving unit 11 attempts the reception of the PDSCH transmitted repeatedly several times.

In Rule 3, when succeeding in the decoding of the plurality of different PDCCHs and acquiring a plurality of different assignment information in the repeated transmission, the UE 100 attempts the reception of the PDSCH by using all of the plurality of different assignment information. If the PDCCH (assignment information) is not correct, the reception of the PDSCH will fail, but the reception of the PDSCH will succeed when the PDCCH (assignment information) is correct. It is allowable for the UE 100 to not apply Rule 3 when the PUSCH is transmitted repeatedly.

(2) Effects and Advantages

The following effects and advantages can be achieved according to the third embodiment. As mentioned earlier, in the present embodiment, the UE 100 determines according to the predetermined rule which one of the PDCCHs (containing the assignment information) that is successfully decoded is to use.

As a result, upon decoding a plurality of PDCCHs (assignment information), the UE 100 can determine which one of the PDCCHs is to use to attempt the reception of PDCCH, so that a disagreement in the assignment resource between the UE 100 and the eNB 200 can be avoided as much as possible.

Accordingly, in the present embodiment, the trouble arising because of transmission and reception of a signal repeatedly several times can be avoided, and communication can be performed appropriately with the radio base station.

Fourth Embodiment

A fourth embodiment according to the present invention is explained next. An explanation is mainly given below about the portions that are different from the first embodiment, and an explanation of portions that are similar is accordingly omitted.

In the EC mode, when the PDCCH (including the scheduling information) is transmitted repeatedly several times, if the UE 100 can not properly receive the PDCCH, the UE 100 may not receive the PDSCH repeatedly transmitted by the eNB 200. In this case, the eNB 200 will transmit the PDSCH repeatedly in vain.

That is, when the UE 100 fails in the reception of the PDCCH, the resource of the downlink (or the uplink) is wasted as the eNB 200 continues the transmission of the PDSCH (or reception of the PUSCH) without noticing the fact that the UE 100 has failed in the reception of the PDCCH.

Specifically, there are situations in which the UE 100 is unable to receive the PDCCH because of a quality bottleneck, the UE 100 wrongly detects the PDCCH and the reception of the PDSCH (or the transmission of the PUSCH) is already started based on the wrongly detected PDCCH, and the like.

Figure 15:
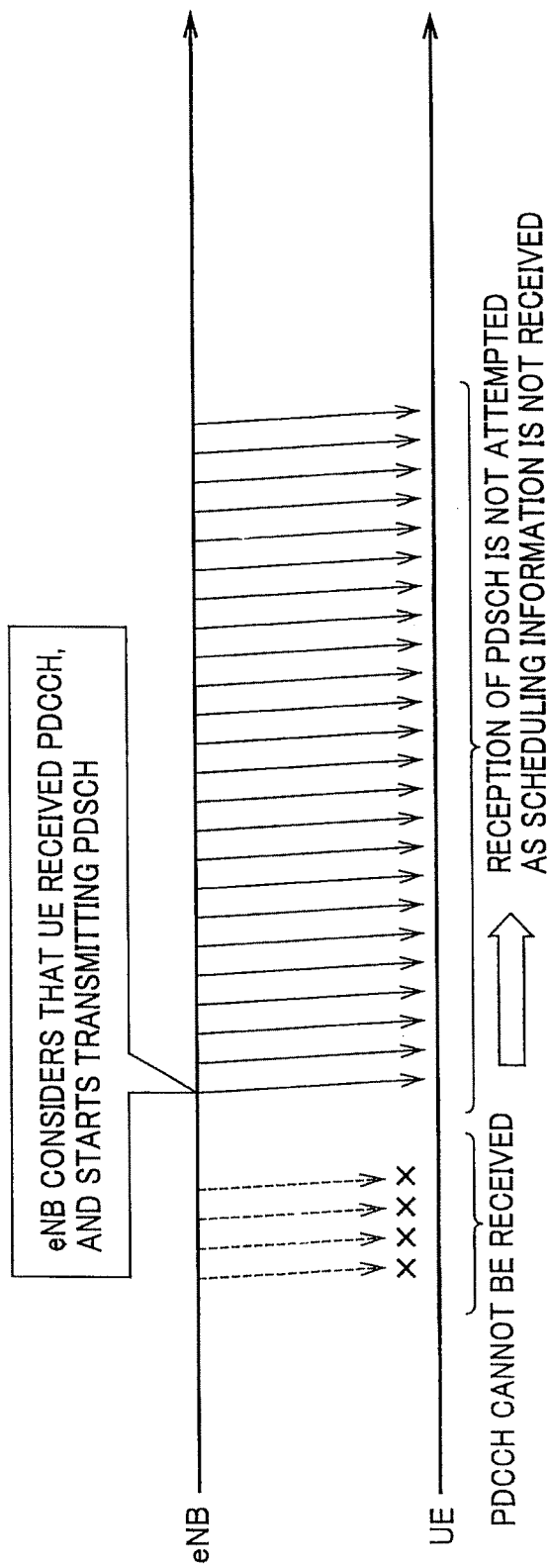
FIG. 15 depicts an operation performed when the UE 100 could not receive the PDCCH.

FIG. 15 depicts an operation performed when the UE 100 cannot receive the PDCCH. In the example shown, the eNB 200 transmits the PDCCH to the UE 100 repeatedly for a predetermined number of times but the UE 100 cannot receive any of the PDCCH.

Because the eNB 200 cannot grasp whether the UE 100 received the PDCCH, the eNB 200 considers that the UE 100 has received the PDCCH and starts transmission of the PDSCH. Because the UE 100 did not receive the PDCCH containing the scheduling information, the UE 100 does not attempt the reception of the PDCCH.

The present embodiment is intended to avoid the waste of the resource of the downlink (or the uplink) when the UE 100 cannot receive the PDCCH properly and the eNB 200 transmits the PDSCH (or attempts the reception of the PUSCH).

(1) Functional Block Configuration of Mobile Communication System

Figure 16:
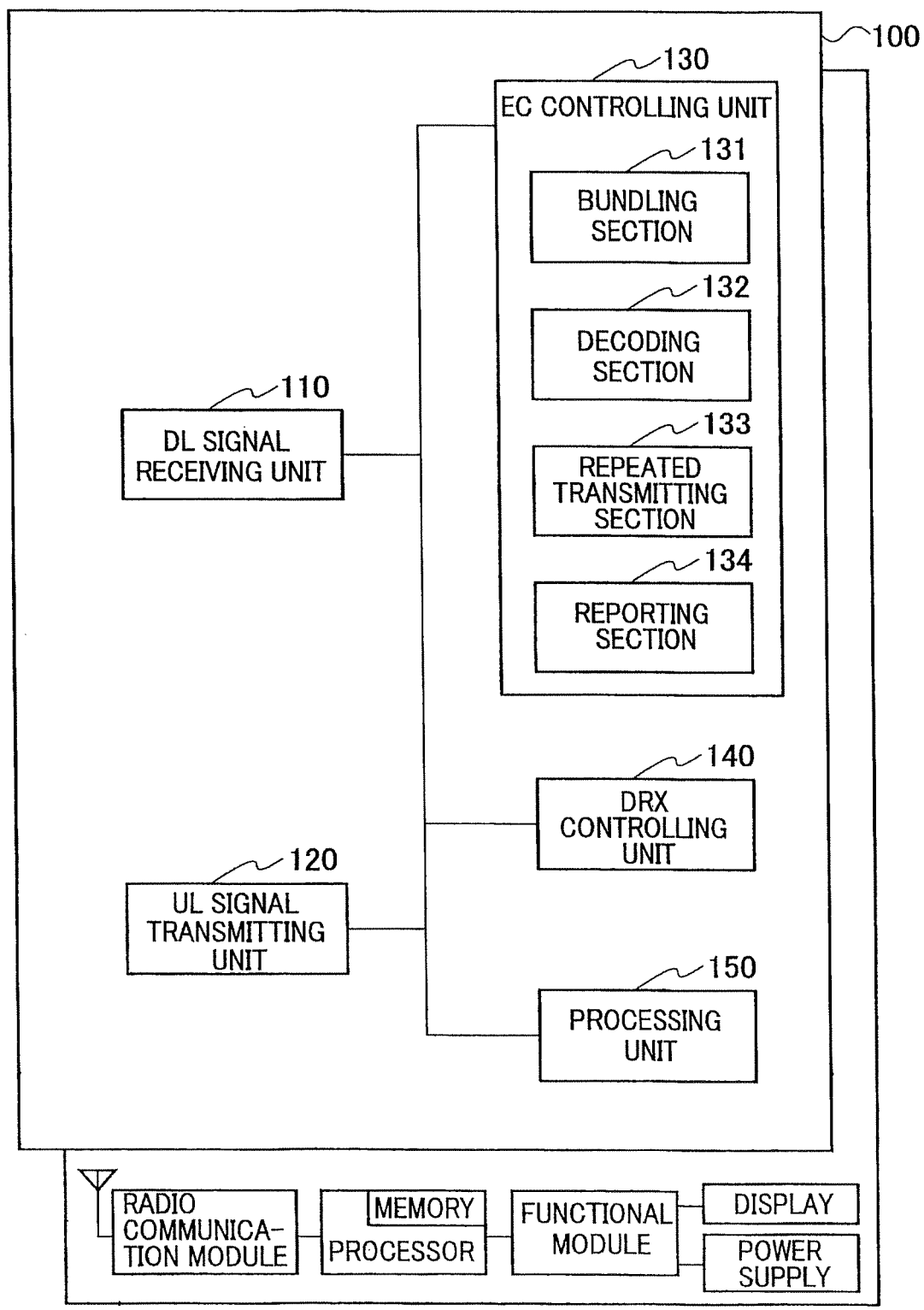
FIG. 16 is a functional block diagram of UE 100 according to a fourth embodiment.

FIG. 16 is a functional block diagram of the UE 100 according to the present embodiment. The UE 100 according to the present embodiment is different from the UE 100 according to the first embodiment shown in FIG. 6 in including a reporting section 134. The eNB 200 according to the present embodiment has the same functional block configuration as the eNB 200 according to the first embodiment shown in FIG. 7. In the present embodiment, the UE 100 need not include the DRX controlling unit 140, moreover, the eNB 200 need not include the DRX controlling unit 240.

In the present embodiment, the UE 100 reports a result of reception of the PDCCH to the eNB 200. As a result, because the eNB 200 can grasp whether the PDCCH is received on the UE 100 side, a situation that the PDSCH is transmitted repeatedly in vain can be avoided.

The reporting section 134 of the UE 100 according to the present embodiment reports (notifies) to the eNB 200 a result of reception of the PDCCH that is transmitted by the eNB 200. The result of reception can be, for example, "reception completed" or "not received (or reception failure)".

Alternatively, the UE 100 can transmit the ACK/NACK with respect to the PDCCH to the eNB 200 thereby reporting the result of reception of the PDCCH to the eNB 200. Such ACK/NACK can be transmitted repeatedly (repetition) or may not be transmitted repeatedly.

Alternatively, the UE 100 can report the result of reception to the eNB 200 by using an individual resource assigned to itself (or to a group of the UEs 100). The individual resource can be assigned periodically. Moreover, even if the individual resource is assigned periodically, the resource can be applied (considered effective) only at a timing immediately after a reception timing of the PDCCH (or during a predetermined period from such a timing).

Moreover, the conventional resource (for example, resource for CSI reporting) can be used as the individual resource. For example, when the result of reception is "not received (or reception failure)", "OOR" can be transmitted.

(2) Operation of Mobile Communication System

An operation of the mobile communication system 10 is explained below.

Figure 17:
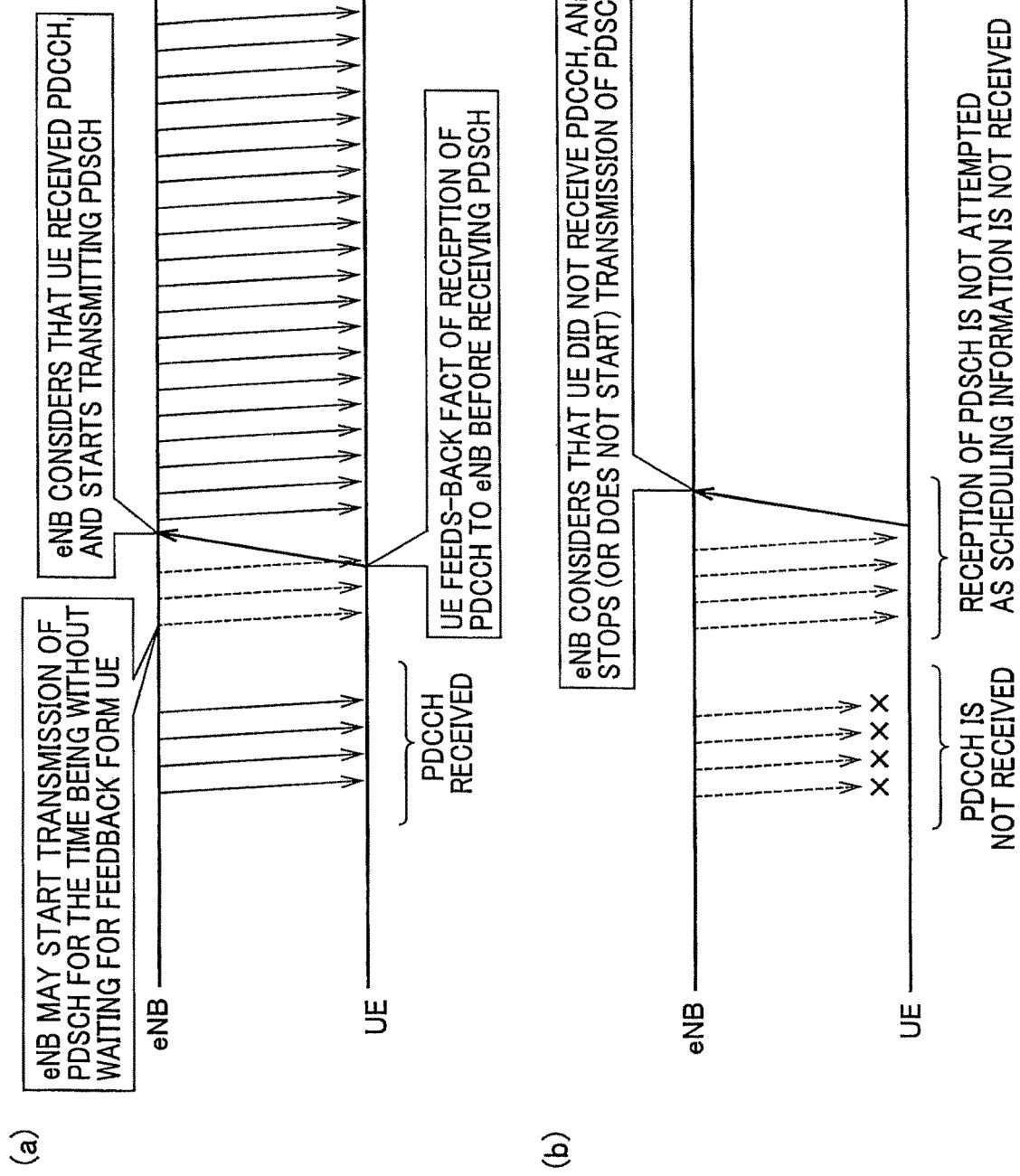
FIG. 17 depicts an operation performed by the UE 100 and eNB 200 according to the fourth embodiment.

FIG. 17 depicts an operation performed by the UE 100 and the eNB 200 according to the present embodiment. FIG. 17(a) depicts an operation performed when the UE 100 reports reception of the PDCCH to the eNB 200. When the PDCCH is received at the reception timing of the PDCCH, the UE 100 transmits and feeds-back the result of reception (reception completed or ACK) to the eNB 200 without waiting for the reception of the PDSCH.

Upon receiving the result of reception transmitted from the UE 100, the eNB 200 considers that the UE 100 received the PDCCH and starts the transmission of the PDSCH to the UE 100. It is allowable for the eNB 200 to start transmission of the PDSCH without waiting for the result of reception from the UE 100.

FIG. 17(b) depicts an operation performed when the UE 100 reports no reception of the PDCCH to the eNB 200. When the PDCCH is not received at the reception timing of the PDCCH, the UE 100 transmits and feeds-back the result of reception (not received or NACK) to the eNB 200 without waiting for the reception of the PDSCH.

Upon receiving the result of reception transmitted from the UE 100, the eNB 200 considers that the UE 100 did not receive the PDCCH and does not start the transmission of the PDSCH to the UE 100. Alternatively, if the transmission of the PDSCH was started without waiting for the result of reception from the UE 100, the eNB 200 stops the transmission of the PDSCH.

It is allowable for the UE 100 to not transmit the result of reception of the PDCCH to the eNB 200 if it did not receive the PDCCH. In this case, if the result of reception is not reported from the UE 100 even if a predetermined time has elapsed after transmission of the PDCCH, the eNB 200 considers that the UE 100 did not receive the PDCCH and does not start the transmission of the PDSCH to the UE 100. Alternatively, if the transmission of the PDSCH was started without waiting for the result of reception from the UE 100, the eNB 200 stops the transmission of the PDSCH.

In the present embodiment, the application timing may be limited. For example, the application timing may be limited to a case in which the state is the active state because of the DRX timer. Alternatively, the application timing may be limited to a case in which a valid uplink transmission timing has been established (for example, when TA timer is running, when individual resource has been assigned).

Moreover, as explained in the first embodiment, it can be determined whether the control of the present embodiment is to be applied or not based on the EC level of the UE 100 or depending on whether the UE 100 is the LC (Low Complexity)-UE.

(3) Effects and Advantages

The following effects and advantages can be achieved according to the fourth embodiment. The UE 100 transmits and feeds-back, at the reception timing of the PDCCH, the result of reception of the PDCCH to the eNB 200 without waiting for the reception of the PDSCH.

As a result, because the eNB 200 can grasp whether the PDCCH is received by the UE 100, the eNB 200 can determine appropriately whether to start the transmission of the PDSCH or to stop the transmission of the PDSCH that is being transmitted depending on the result of reception of the PDCCH.

Therefore, according to the present embodiment, it is possible to avoid the waste of the resource of the downlink (or the uplink) when the UE 100 cannot receive the PDCCH properly and the eNB 200 transmits the PDSCH (or attempts the reception of the PUSCH) without noticing the fact that the UE 100 has failed in the reception of the PDCCH.

Accordingly, in the present embodiment, the trouble arising because of transmission and reception of a signal repeatedly several times can be avoided, and communication can be performed appropriately with the radio base station.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, one or more among the first embodiment to the fourth embodiment can be combined to perform the repeated transmission control in the EC mode.

The present invention can be expressed as below.

According to one aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a bundling unit (bundling section 131) that bundles the physical downlink control channel transmitted several times; and a discontinuous reception controlling unit (DRX controlling unit 140) that detects whether it is necessary to start a timer for managing an active state in a discontinuous reception control based on the bundled physical downlink control channel, and upon detecting that it is not necessary to start the timer, shifts to an inactive state without starting the timer but stopping the already started timer.

According to another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times and a physical downlink shared channel transmitted repeatedly several times; a bundling unit (bundling section 131) that bundles the physical downlink control channel transmitted several times and the physical downlink shared channel transmitted several times; and a discontinuous reception controlling unit (DRX controlling unit 140) that starts a timer for managing an active state in a discontinuous reception control after reception of the physical downlink shared channel based on the bundled physical downlink control channel. The discontinuous reception controlling unit shifts to an inactive state when the timer expires.

In the above aspect of the present invention, after reception of the physical downlink shared channel includes any one among a timing of completion of reception of the physical downlink shared channel for a predetermined number of times, a timing of last reception of the physical downlink shared channel, a timing of first reception of the physical downlink shared channel, a timing of successful decoding of the physical downlink shared channel, and a timing of transmission of ACK or NACK corresponding to the physical downlink shared channel.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a bundling unit (bundling section 131) that bundles the physical downlink control channel transmitted several times; and a discontinuous reception controlling unit (DRX controlling unit 140) that starts a timer for managing an active state in a discontinuous reception control at a timing of successful decoding of the physical downlink control channel. The discontinuous reception controlling unit starts the timer for a period that takes into account a period from the point in time at which the reception of the physical downlink control channel is attempted first to a point in time at which the timer is started. The discontinuous reception controlling unit shifts to an inactive state when the timer expires.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a bundling unit (bundling section 131) that bundles the physical downlink control channel transmitted several times; and a discontinuous reception controlling unit (DRX controlling unit 140) that starts a timer for managing an active state in a discontinuous reception control at the timing at which the last one of the physical downlink control channel is received among the physical downlink control channel transmitted several times. The discontinuous reception controlling unit shifts to an inactive state when the timer expires.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a bundling unit (bundling section 131) that bundles the physical downlink control channel transmitted several times; and a discontinuous reception controlling unit (DRX controlling unit 140) that starts a timer for managing an active state in a discontinuous reception control each time the physical downlink control channel is received. The discontinuous reception controlling unit shifts to an inactive state when the timer expires.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; and a decoding unit (decoding section 132) that attempts decoding of the physical downlink control channel, and upon succeeding in the decoding, does not perform decoding of following physical downlink control channel transmitted repeatedly, or upon succeeding in the decoding of the following physical downlink control channel transmitted repeatedly, discards the physical downlink control channel. The receiving unit attempts reception of a physical downlink shared channel transmitted repeatedly several times based on the physical downlink control channel that was successfully decoded first.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a decoding unit (decoding section 132) that attempts decoding of the physical downlink control channel, and after succeeding in the decoding once, upon succeeding in the decoding of a different physical downlink control channel by using following physical downlink control channel transmitted repeatedly, discards the physical downlink control channel that was decoded earlier. The receiving unit attempts reception of a physical downlink shared channel transmitted repeatedly several times based on the physical downlink control channel that was successfully decoded subsequently.

According to still another aspect of the present invention, a radio communication device (for example, UE 100) in which repeated transmission and reception is performed depending on a reception power level of a radio signal transmitted by a radio base station, includes a receiving unit (DL signal receiving unit 110) that receives a physical downlink control channel transmitted repeatedly several times; a decoding unit (decoding section 132) that attempts decoding of the physical downlink control channel, and even after succeeding in the decoding of an earlier physical downlink control channel, attempts decoding of a different physical downlink control channel by using following physical downlink control channel transmitted repeatedly. The receiving unit attempts, when succeeding in the decoding of a plurality of different physical downlink control channels, reception of a physical downlink shared channel transmitted repeatedly several times based on each of the physical downlink control channels that was successfully decoded.

As described above, the details of the present invention have been disclosed by using the embodiment of the present invention. However, the description and drawings which constitute part of this disclosure should not be interpreted so as to limit the present invention. From this disclosure, various alternative embodiments, examples, and operation techniques will be easily apparent to a person skilled in the art.

The entire contents of Japanese Patent Application 2015-223485 (filed on Nov. 13, 2015) are incorporated in the description of the present application by reference.

INDUSTRIAL APPLICABILITY

According to the above mentioned radio communication device, the trouble arising because of transmission and reception of a signal repeatedly several times can be avoided, and communication can be performed appropriately with the radio base station.

EXPLANATION OF REFERENCE NUMERALS

10 mobile communication system
20 radio access network
100 UE
110 DL signal receiving unit
120 UL signal receiving unit
130 EC controlling unit
131 bundling section
132 decoding section
133 repeated transmitting section
134 reporting section
140 DRX controlling unit
150 processing unit
200 eNB
210 DL signal transmitting unit
220 UL signal receiving unit
230 EC controlling unit
231 bundling section
232 decoding section
233 repeated transmitting section
240 DRX controlling unit
250 processing unit

The invention claimed is:

1. A radio communication device in which repeated transmission and reception is performed depending on a reception power level of a radio signal transmitted by a radio base station, comprising:
a receiving unit that receives a physical downlink control channel transmitted repeatedly several times;
a bundling unit that bundles the physical downlink control channel transmitted several times; and
a discontinuous reception controlling unit that detects whether it is necessary to start a timer for managing an active state in a discontinuous reception control based on the bundled physical downlink control channel, and upon detecting that it is not necessary to start the timer, shifts to an inactive state without starting the timer but stopping the already started timer.

2. A radio communication device in which repeated transmission and reception is performed depending on a reception power level of a radio signal transmitted by a radio base station, comprising:
a receiving unit that receives a physical downlink control channel transmitted repeatedly several times and a physical downlink shared channel transmitted repeatedly several times;
a bundling unit that bundles the physical downlink control channel transmitted several times and the physical downlink shared channel transmitted several times; and
a discontinuous reception controlling unit that starts a timer for managing an active state in a discontinuous reception control after reception of the physical downlink shared channel based on the bundled physical downlink control channel, wherein
the discontinuous reception controlling unit shifts to an inactive state when the timer expires.

3. The radio communication device as claimed in claim 2, wherein after reception of the physical downlink shared channel includes any one among
a timing of reception of the physical downlink shared channel for a predetermined number of times,
a timing of last reception of the physical downlink shared channel,
a timing of first reception of the physical downlink shared channel,
a timing of successful decoding of the physical downlink shared channel, and
a timing of transmission of ACK or NACK corresponding to the physical downlink shared channel.

4. A radio communication device in which repeated transmission and reception is performed depending on a reception power level of a radio signal transmitted by a radio base station, comprising:
a receiving unit that receives a physical downlink control channel transmitted repeatedly several times;

a bundling unit that bundles the physical downlink control channel transmitted several times; and a discontinuous reception controlling unit that starts a timer for managing an active state in a discontinuous reception control at a timing of successful decoding of the physical downlink control channel, wherein the discontinuous reception controlling unit starts the timer for a period that takes into account a period from the point in time at which the reception of the physical downlink control channel is attempted first to a point in time at which the timer is started, and the discontinuous reception controlling unit shifts to an inactive state when the timer expires.

5. A radio communication device in which repeated transmission and reception is performed depending on a reception power level of a radio signal transmitted by a radio base station, comprising:

a receiving unit that receives a physical downlink control channel transmitted repeatedly several times;

a bundling unit that bundles the physical downlink control channel transmitted several times; and a discontinuous reception controlling unit that starts a timer for managing an active state in a discontinuous reception control at the timing at which the last one of the physical downlink control channel is received among the physical downlink control channel transmitted several times, wherein the discontinuous reception controlling unit shifts to an inactive state when the timer expires.

6. A radio communication device in which repeated transmission and reception is performed depending on a reception power level of a radio signal transmitted by a radio base station, comprising:

a receiving unit that receives a physical downlink control channel transmitted repeatedly several times;

a bundling unit that bundles the physical downlink control channel transmitted several times; and a discontinuous reception controlling unit that starts a timer for managing an active state in a discontinuous reception control each time the physical downlink control channel is received, wherein the discontinuous reception controlling unit shifts to an inactive state when the timer expires.

7. A radio communication device in which repeated transmission and reception is performed depending on a reception power level of a radio signal transmitted by a radio base station, comprising:

a receiving unit that receives a physical downlink control channel transmitted repeatedly several times; and a decoding unit that attempts decoding of the physical downlink control channel, and upon succeeding in the decoding, does not perform decoding of following physical downlink control channel transmitted repeatedly, or upon succeeding in the decoding of the following physical downlink control channel transmitted repeatedly, discards the physical downlink control channel, wherein the receiving unit attempts reception of a physical downlink shared channel transmitted repeatedly several times based on the physical downlink control channel that was successfully decoded first.

8. A radio communication device in which repeated transmission and reception is performed depending on a reception power level of a radio signal transmitted by a radio base station, comprising:

a receiving unit that receives a physical downlink control channel transmitted repeatedly several times;

a decoding unit that attempts decoding of the physical downlink control channel, and after succeeding in the decoding once, upon succeeding in the decoding of a different physical downlink control channel by using following physical downlink control channel transmitted repeatedly, discards the physical downlink control channel that was decoded earlier, wherein the receiving unit attempts reception of a physical downlink shared channel transmitted repeatedly several times based on the physical downlink control channel that was successfully decoded subsequently.

9. A radio communication device in which repeated transmission and reception is performed depending on a reception power level of a radio signal transmitted by a radio base station, comprising:

a receiving unit that receives a physical downlink control channel transmitted repeatedly several times;

a decoding unit that attempts decoding of the physical downlink control channel, and even after succeeding in the decoding of an earlier physical downlink control channel, attempts decoding of a different physical downlink control channel by using following physical downlink control channel transmitted repeatedly, wherein the receiving unit attempts, when succeeding in the decoding of a plurality of different physical downlink control channels, reception of a physical downlink shared channel transmitted repeatedly several times based on each of the physical downlink control channels that was successfully decoded.

* * * * *